(12) United States Patent
Holland

(10) Patent No.: US 11,429,012 B2
(45) Date of Patent: Aug. 30, 2022

(54) AUDIOVISUAL APPARATUS FOR SIMULTANEOUS ACQUISITION AND MANAGEMENT OF COVERAGE ON PRODUCTION SETS

(71) Applicant: David Craig Holland, Los Angeles, CA (US)

(72) Inventor: David Craig Holland, Los Angeles, CA (US)

( * ) Notice: Subject to any disclaimer, the term of this patent is extended or adjusted under 35 U.S.C. 154(b) by 0 days.

(21) Appl. No.: 17/148,417

(22) Filed: Jan. 13, 2021

(65) Prior Publication Data

US 2021/0132477 A1    May 6, 2021

Related U.S. Application Data

(63) Continuation-in-part of application No. 29/675,397, filed on Dec. 31, 2018, now Pat. No. Des. 908,165.

(51) Int. Cl.
*G03B 17/56* (2021.01)
*G03B 17/48* (2021.01)

(52) U.S. Cl.
CPC .......... *G03B 17/561* (2013.01); *G03B 17/48* (2013.01); *G03B 17/565* (2013.01)

(58) Field of Classification Search
CPC ........ G03B 7/561; G03B 17/48; G03B 35/08; G03B 37/04
See application file for complete search history.

(56) References Cited

U.S. PATENT DOCUMENTS

| | | | | |
|---|---|---|---|---|
| 1,840,556 | A * | 1/1932 | Arnold | G03B 17/561 248/163.1 |
| 3,970,835 | A * | 7/1976 | Crete | G03B 15/02 362/11 |
| 7,450,835 | B2 | 11/2008 | Lackey et al. | |
| 9,243,737 | B2 | 1/2016 | Hida | |
| 9,706,187 | B2 | 7/2017 | Ghyme | |
| 10,795,245 | B1 * | 10/2020 | Kaiser | H04N 5/2252 |
| 2004/0257464 | A1 | 12/2004 | Pandit et al. | |
| 2011/0129210 | A1 * | 6/2011 | McGucken | G06Q 99/00 396/422 |
| 2017/0176841 | A1 | 6/2017 | Ghyme | |
| 2019/0154194 | A1 * | 5/2019 | Leblanc | B66C 23/62 |

FOREIGN PATENT DOCUMENTS

| | | | | |
|---|---|---|---|---|
| EP | 2919067 B1 | 10/2017 | | |
| GB | 2481642 A * | 1/2012 | | G03B 35/08 |

* cited by examiner

*Primary Examiner* — Christopher E Mahoney

(57) ABSTRACT

Disclosed herein is a standalone audiovisual apparatus for the simultaneous acquisition and management of coverage, the simultaneous recording, and live on-the-fly editing of multiple angles, in accordance with some embodiments. Accordingly, the audiovisual apparatus comprises a body and arms. Further, the body comprises an upper body portion and a lower body portion. Further, the upper body portion comprises a body adapter disposed on the upper body portion. Further, the body adapter is configured for detachably attaching a primary recording device to the body adapter. Further, the lower body portion is disposable on a surface. Further, the arms are coupled to the body. Further, the arms comprise arm adapters. Further, the arm adapters are configured for detachably attaching secondary recording devices to the arm adapters. Further, the arms are configured for moving between arm positions in relation to the body for positioning the secondary recording devices in secondary recording positions.

19 Claims, 35 Drawing Sheets

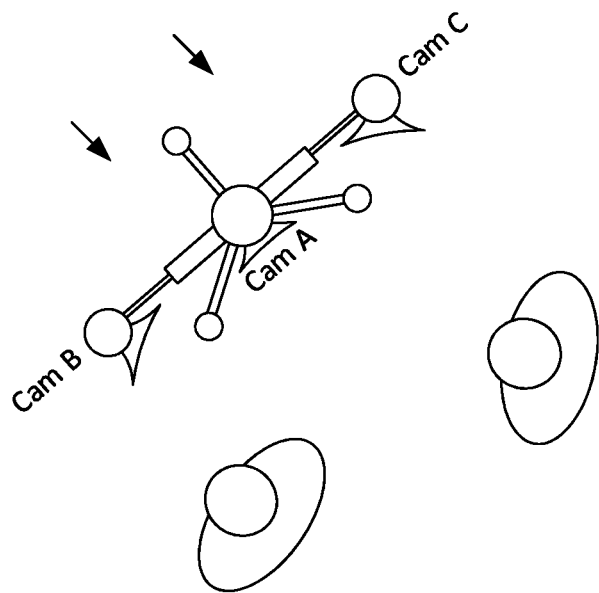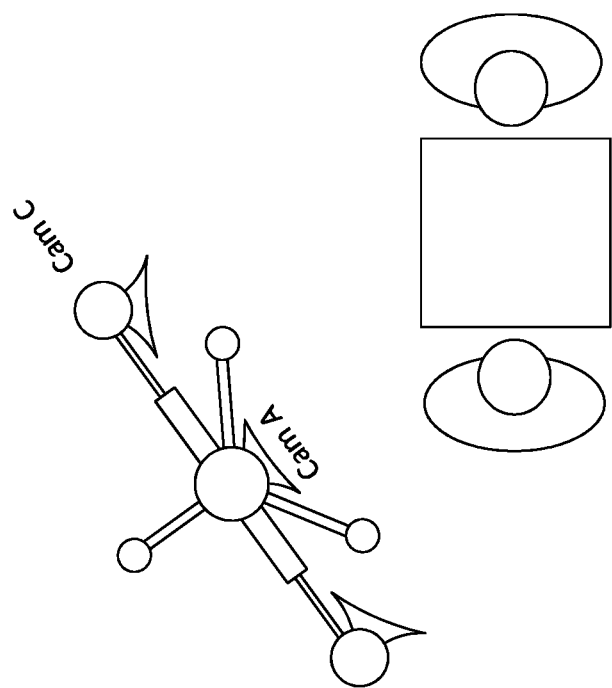
FIG. 34

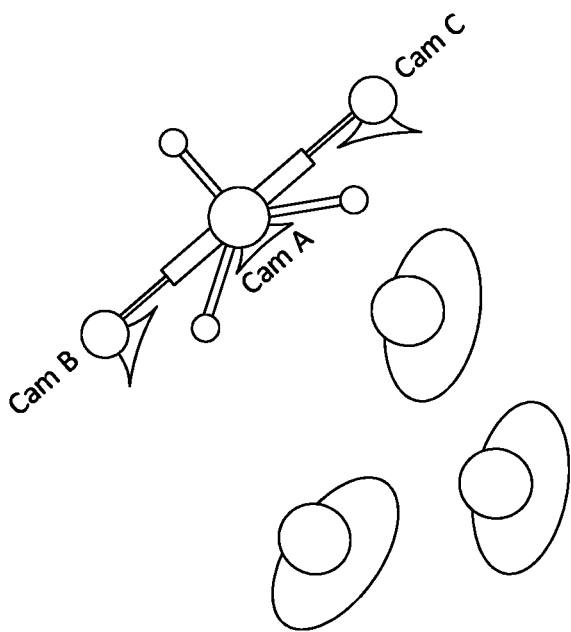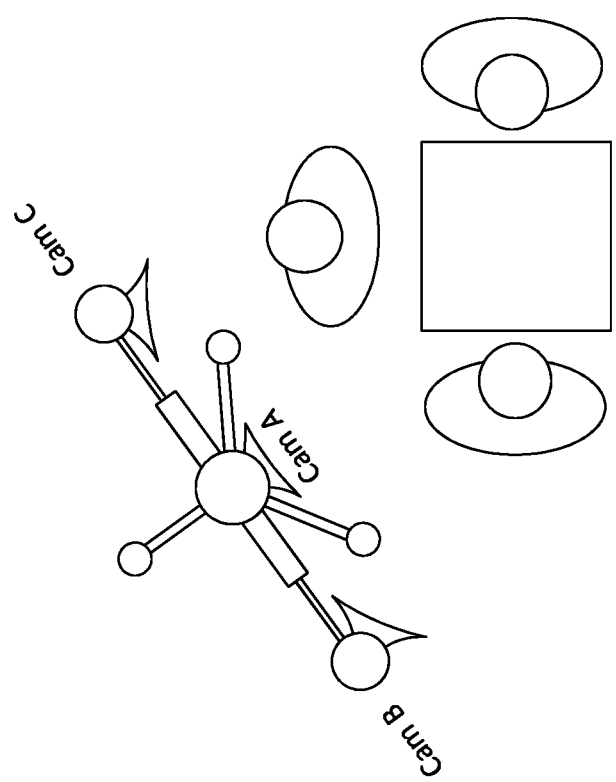
FIG. 35

AUDIOVISUAL APPARATUS FOR SIMULTANEOUS ACQUISITION AND MANAGEMENT OF COVERAGE ON PRODUCTION SETS

The current application is a continuation-in-part (CIP) application of the U.S. design application Ser. No. 29/675,397 filed on Dec. 31, 2018.

FIELD OF THE INVENTION

Generally, the present disclosure relates to the field of supports. More specifically, the present disclosure relates to apparatuses and devices for facilitating management of multiple audiovisual recording devices, specifically to execute simultaneous shooting of 'coverage' a term in filmmaking referring to shooting a multiplicity of angles invariably comprising, a master shot, an angle, and a reverse shot.

BACKGROUND OF THE INVENTION

No motion picture, with dialogue scenes, is shot without shooting 'coverage.' Coverage is a filmmaking term that refers to the shooting of three basic angles: master, angle, and reverse angle. The 'master' shot, is a shot that orients the viewer to subjects in a scene, typically two or more subjects in a dialogue scene. The master shot covers the spatial relation of subjects A and B, as seen in a simple interview, or a dinner-in-a-diner scene for example, and is typically wide, depicting subjects from head to toe in their surroundings. The 'angle' shot is typically a closer, head to shoulder or head to waist, shot on one of the subjects, for instance, subject A talking to B, and the 'reverse angle' is typically an identical closer shot on subject B talking to A, but shot from the opposing reverse angle to A on the same 180 degree plane.

There are typically two scenarios for shooting coverage today. In scenario one, an operator on a single-camera shoot is required to move the camera three or more times to capture all the angles as the actors repeat their lines over and over to match all three angles. This is tedious and time consuming, and time on a film set is expensive. Scenario two requires three cameras and three operators. This is faster but still expensive, and invariably, even if the budget allows it, there is rarely enough room to fit three camera operators and their tripods. Examples of cramped spaces being elevators, a prison cell, a hot air balloon, a car, or a small diner. Furthermore, the use of three separate cameras and three camera operators creates editing clutter, bloats the workflow, and presents a data management nightmare on set for the Digital Imaging Technician, (DIT), the Director of Photography, (DoP), and the entire Cinematography department in general.

Furthermore, in a pandemic where social distancing is required on set, cramming six people required to shoot three angles, if we count the operators and camera assistants for all three cameras, such a shooting setup could be problematic.

Therefore, there is a need for a standalone apparatus for the acquisition and management of multiple angles, as recorded, by facilitating management of multiple recording modules within the standalone device that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a standalone audiovisual apparatus for the simultaneous acquisition and management of coverage, the simultaneous recording, and live on-the-fly editing of multiple angles, in accordance with some embodiments. Accordingly, the audiovisual apparatus may include a body and a plurality of arms. Further, the body may include an upper body portion and a lower body portion. Further, the upper body portion may include at least one body adapter disposed on the upper body portion. Further, the at least one body adapter may be configured for detachably attaching at least one primary recording device to the at least one body adapter. Further, the lower body portion may be disposable on at least one surface. Further, the lower body portion may be configured for positioning the audiovisual apparatus in at least one position. Further, the positioning of the audiovisual apparatus positions the at least one primary recording device in at least one primary recording position. Further, the plurality of arms may be coupled to the body. Further, the plurality of arms extends away from the body. Further, a first arm end of each of the plurality of arms may be attached to the upper body portion. Further, the plurality of arms may include a plurality of arm adapters. Further, an arm adapter of the plurality of arm adapters may be comprised in a second arm end of each of the plurality of arms. Further, the plurality of arm adapters may be configured for detachably attaching a plurality of secondary recording devices to the plurality of arm adapters. Further, the plurality of arms may be configured for moving between a plurality of arm positions in relation to the body for positioning the plurality of secondary recording devices in a plurality of secondary recording positions.

Further disclosed herein is a standalone audiovisual apparatus for the simultaneous acquisition and management of coverage, the simultaneous recording, and live on-the-fly editing of multiple angles, in accordance with some embodiments. Accordingly, the audiovisual apparatus may include a body and a plurality of arms. Further, the body may include an upper body portion and a lower body portion. Further, the upper body portion may include at least one body adapter disposed on the upper body portion. Further, the at least one body adapter may be configured for detachably attaching at least one primary recording device to the at least one body adapter. Further, the lower body portion may be disposable on at least one surface. Further, the lower body portion may be configured for positioning the audiovisual apparatus in at least one position. Further, the lower body portion may include a plurality of legs. Further, a first leg end of each of the plurality of legs may be attached to the upper body portion. Further, a second leg end of each of the plurality of legs may be disposable on the at least one surface. Further, the plurality of legs may be configured for moving between a plurality of leg positions. Further, the positioning of the audiovisual apparatus in the at least one position may be based on the moving of the plurality of legs between the plurality of leg positions. Further, the positioning of the audiovisual apparatus positions the at least one primary recording device in at least one primary recording position. Further, the plurality of arms may be coupled to the body. Further, the plurality of arms extends away from the body. Further, a first arm end of each of the plurality of arms may be attached to the upper body portion. Further, the plurality of arms may include a plurality of arm adapters. Further, an arm adapter of the plurality of arm adapters may be comprised in a second arm end of each of the plurality of arms. Further, the plurality of arm adapters may be configured for detachably attaching a plurality of secondary recording devices to the plurality of arm adapters. Further, the plurality of arms may be configured for moving between a plurality of arm positions in relation to the body for positioning the plurality of secondary recording devices in a plurality of secondary recording positions.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 34 illustrates daisy-chain and synchronization of multiple audiovisual apparatuses for crossing room distances for facilitating multiple recordings, in accordance with some embodiments.

FIG. 35 illustrates a drag and drop floor plan of multiple audiovisual apparatuses for facilitating multiple recordings, in accordance with some embodiments.

DETAILED DESCRIPTION OF THE INVENTION

Figure 1:
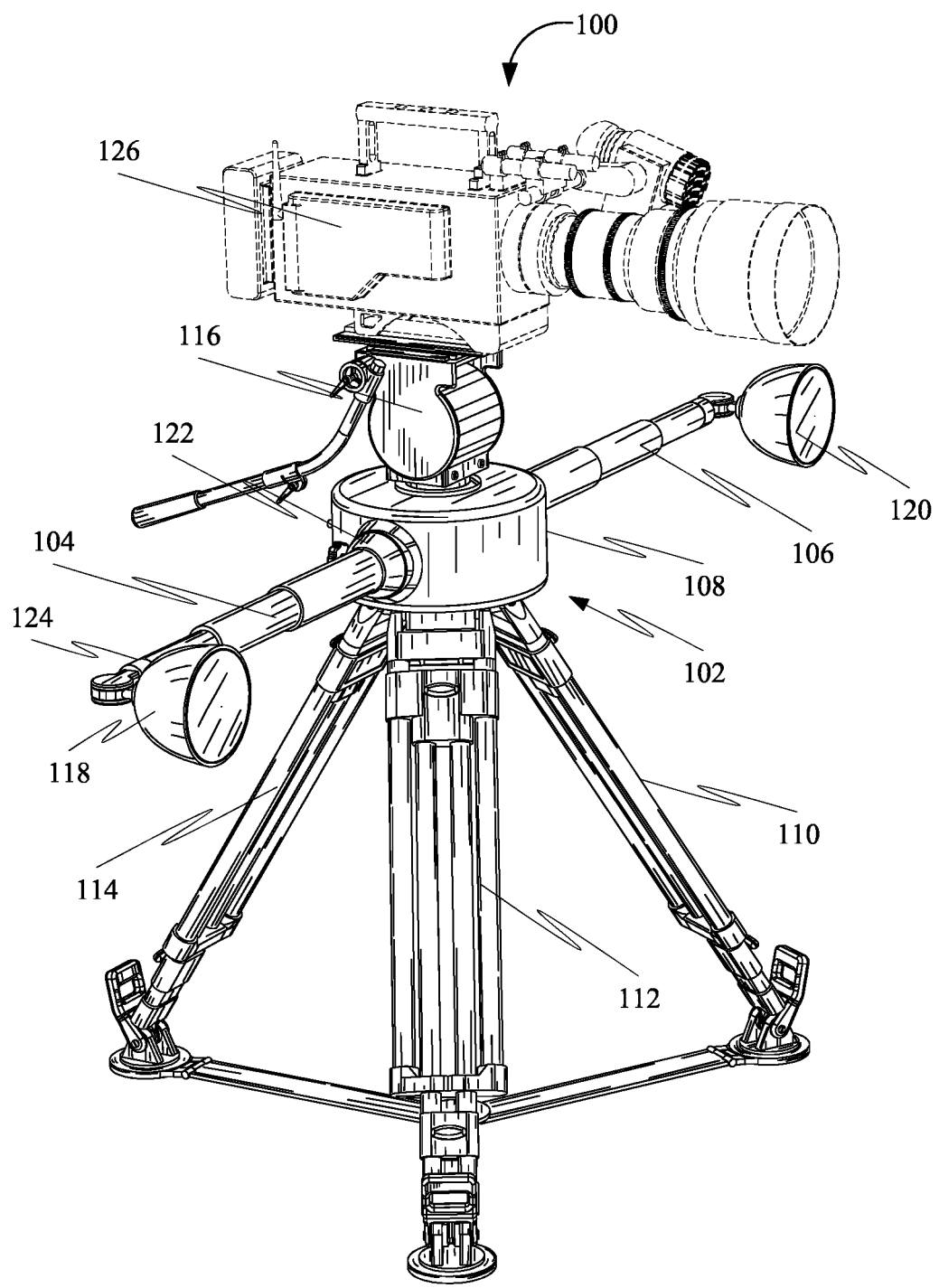
FIG. 1 is a top front perspective view of a standalone audiovisual apparatus for the simultaneous acquisition and management of coverage, the simultaneous recording, and live on-the-fly editing of multiple angles, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of apparatuses and devices for facilitating management of multiple recording devices, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes a standalone apparatus and processes for acquiring and editing coverage live, facilitating management of multiple audiovisual recording modules within a standalone system. Further, the disclosed apparatus includes a three-headed camera system. The three-headed video camera system is an audiovisual recording system that controls one main camera and two external satellite cameras attached by articulating/telescoping wired extension arms to a smart collar hub that sits between a head and a support. The disclosed apparatus eschews duplicating components like a screen or a battery in the satellite cameras and houses these components in the main camera body along with any additional System on Chips (SoCs) required to process images from the satellite cameras. These external camera modules would preferably be the size of a golf ball, a tennis ball, or a grapefruit to accommodate optimally sized sensors for the Digital Single-Lens Reflex (DSLR) camera. In other words, the size of the lens and sensor would dictate the size of the camera module as opposed to the screen and battery, and other components. Consequently, a stripped down DSLR camera module comprising a camera lens, image sensor, and Image Signal Processor could easily fit inside a small enclosure. In addition, if the other components such as the power, monitoring components, and processing can be housed in a central system, then the satellite camera can be as small and as light as it needs to be, opening up a world of options for a filmmaker. The satellite cameras of the disclosed apparatus can be placed anywhere yet capture the same image quality as the main camera. Either way, the need for three different takes with one camera, or three full camera bodies, or three full cell phones to capture three different camera angles will be negated with the disclosed apparatus.

Further, the three-headed-camera system comprises production software that enables live editing of the three angles, and post-production plugin software that facilitates ingestion of and automatically appending footage to the timeline of a Non Linear Editing system like Final Cut, Davinci Resolve, or Premiere.

Further, the three-headed camera system preferably comprises five major modules—a main camera, a plurality of satellite cameras, a smart collar hub, a plurality of satellite camera supports, and a plurality of arms. Further, the main camera is a complete camera unit that also houses the main Image Signal Processor (ISP) which processes images from the plurality of satellite cameras which each comprise a camera lens, an image sensor, and satellite ISPs. The plurality of satellite cameras comprises two satellite cameras which are essentially bare bones camera modules, each comprising a camera lens and an image sensor and an ISP connected to the main camera via the smart collar hub by cables for power and data transfer. The plurality of cables may run through the plurality of arms. The smart collar hub is the Universal Serial Bus (USB) hub which holds all the heavy components and connects/powers all components. The smart collar hub comprises a tripod-borne control hub which houses data, power/batteries, HDMI inputs, and professional audio provisions: a pre-amp built into the hub with gain control, three XLR inputs, TRRS and TRS inputs for cross-compatibility with cameras and smartphones, and mixed-use of the same. The disclosed apparatus further provides the facility of RAID redundancy recording and media storage within the hub. The plurality of arms is preferably connected to the smart collar hub utilizing heavy-duty ball joints. The disclosed apparatus may be provided in different tiers according to the need of the users, manual, semi-autonomous to an artificial intelligence driven fully autonomous robot. Recording high-resolution media from three sources using the three-headed camera system requires not only processing but also recording and storage. The smart collar hub quadruples the read and write speed that will be required to operate a plurality of cameras simultaneously. Further, the smart collar hub comprises a body with an enclosure holding a plurality of electrical components. The smart collar hub forgoes traditional cards and records directly to SSD or high-speed, high-capacity storage drives, such as the 500 GB or 1 TB flash drives. Alternatively, data could be recorded on three different cards simultaneously. The smart collar hub preferably sits between the plurality of tripod legs and the one or more tripod heads. Further, the smart collar hub connects to the plurality of legs through a bottom connector which allows the smart collar hub to be attached/removed as well as to rotate about the plurality of legs. The main camera is positioned above the smart collar hub and connects to the smart collar hub through one or more adapters. The one or more adapters allow the main camera to be rotated, tilted, etc. Furthermore, the smart collar hub comprises a plurality of joints that attach the plurality of arms to the smart collar hub. Further, the one or more connectors are ball-joint sockets that can each support preferably up to and beyond 100 lbs. or 40 kg, depending on the camera components used. The smart collar hub enables the videographer to place a plurality of cameras, a plurality of electronic devices, or a combination on one tripod when pressed for money, space, time, or all. The smart collar hub is a modular, future-proof Universal Serial Bus (USB) 3.1 hub that connects a plurality of batteries or power banks as well as a plurality of connectors including but not limited to, HDMI, USB, SSDs, XLR, and TRS connectors plus a slot for a lapel microphone receiver. Any universal connector that delivers both data and power may be used or swapped out due to its modular design.

Further, the plurality of satellite cameras is supported by the plurality of arms. The plurality of arms comprises a telescopic body with a first end connected to the plurality of joints on the smart collar hub. The second end of the plurality of arms is connected to the plurality of satellite cameras. Further, the plurality of arms comprises a telescopic mechanism that allows the length and orientation of the body of the plurality of arms to be changed manually or automatically by the users. The plurality of arms preferably comprises articulating extension arms made from carbon fiber. Data and power cables run through the plurality of arms to connect the plurality of satellite cameras to the main camera via the smart collar hub. Motorized control arms are further connected to the plurality of arms which working in concert with the automatic leveling system to change the viewing plane, attitude, and height of the plurality of satellite cameras as the plurality of satellite cameras track their subject. A digital and physical joystick control pad is provided to control the plurality of satellite cameras as well as a micro jib-hinged holder for light boom poles or micro-jibs. Further, the plurality of satellite cameras comprises one or more adapters and one or more receivers. The one or more adapters and one or more receivers of the plurality of satellite cameras preferably comprise a plurality of gyroscopic three-axis gimbals which holds the satellite cameras level as the operator changes the attitude or angle of the plurality of satellite cameras by moving the plurality of arms, negating the need to level the plurality of satellite cameras every time the plurality of arms is moved or adjusted. The plurality of satellite camera modules can be detached from the telescoping arms and snapped onto the sides of the main camera for side by side shooting in a cramped space. Three-axis gimbals at the end of the plurality of arms comprise an automatic leveling feature for when the height, position, or attitude of the satellite cameras are changing. Additionally, the disclosed apparatus comprises an image capturing system that allows a main camera unit to control the plurality of satellite camera modules remotely. Satellite cameras are controlled and monitored by an application that may be installed on a cell phone or similar mobile device, or by the main DSLR camera, but record directly onto the SSD on the smart collar hub or into a micro SD card on the satellite camera. The application of the disclosed apparatus will have the capability to switch between three monitored scenes and or show all three at the same time, preferably on a large tablet. The application of the disclosed apparatus will also provide a monitoring and switching function from the plurality of cameras, automatically executing a 'macro,' a pre-programmed set of computer commands: cut in (to footage), cut out (from footage), append (footage) to timeline thereby facilitating rough cuts on the set, for live streaming or later ingestion into a Non-Linear Editing (NLE) system. All connections to the heart of the smart collar hub are either by USB prosumer and professional connections. The smart collar hub should be modular, and thus a one-time purchase for all videographers. As users upgrade their recording devices, users merely have to upgrade the plurality of satellite cameras, main camera engine—the processing unit, or the users can upgrade to a heavier class or professional version of the disclosed apparatus (the main camera and plurality of satellite cameras) or their own DSLR system.

Further, the three-headed camera system comprises a heavy-duty tripod to support the main camera, the smart collar hub, and the plurality of arms. The plurality of legs of the heavy-duty tripod comprises a locking mechanism and telescopic mechanism which allows the plurality of legs to be extended/contracted and positioned according to the users' desired orientation. The embodiment of the appendages described can be manual, semi-autonomous, or robotic fully autonomous, driven by artificial intelligence. The plurality of legs of the heavy-duty tripod further comprises a base that receives a plurality of wheels and a plurality of ends. The plurality of ends comprises a plurality of protrusions that may be positioned at different angles to help level the disclosed apparatus. A locking mechanism can further be provided with the plurality of ends and plurality of wheels to help secure the position/orientation of the disclosed apparatus. In some embodiments of the disclosed apparatus, one or more supports are further positioned on the base of the plurality of legs. The one or more supports are preferably a heavy-duty support which aids in the support of the plurality of components resting on the plurality of legs in versions of the disclosed apparatus utilizing heavier, more sophisticated equipment and can be adapted for specific technical needs. In addition to being modular, the invention can come in three forms: Full Form, Basic Form, and Regular Form. The ready-to-shoot device in full form comes with the camera system, a proprietary tripod with retractable arms attached to the smart collar hub which sits between the tripod legs and the tripod fluid head. The camera system can still be detached but the tripod, plurality of arms, and smart collar hub are a complete unit. In basic form, we have the smart collar hub with a plurality of arms to which micro cameras are attached. This smart collar hub can sit on any existing tripod. Finally, the smart collar hub may come in regular form. In regular form, the disclosed apparatus is fully mechanical. The smart collar hub has no connectors and no wires and no connectivity, it is a simple ball joint collar with support arms that carry additional DSLRs or cell phones at the end of the plurality of arms. This unit might be for the holdout purist who is reluctant to shoot with micro cameras, the person who still wishes to shoot with three full DSLR cameras but is happy to save time, utilize smaller spaces, or shoot with a smaller crew. Since the regular collar will be carrying full-size DSLRs or full-size cell phones, it needs to be engineered accordingly to support more weight.

Further, the three-headed camera system comprises a Production Management System (PMS). The PMS provides the facility to monitor footage from the plurality of cameras on one screen simultaneously (split-screen) or to switch from camera to camera. The PMS further allows users to monitor and control audio, as well as to, through the touch screen, click to automatically execute a 'macro,' a pre-programmed set of computer commands: cut in (to footage), cut out (from footage), append (footage) to timeline, to compile a rough cut live, in-camera by switch-cutting in-app from camera to camera with simple taps or clicks on a portable device, all while simultaneously recording uncut footage separately. The PMS of the disclosed apparatus further provides the facility to simultaneously record light-weight SD proxy media for rough-cut management, along with the facility to import or load "shooting-scripts" and shot lists for use on set. In the preferred embodiment of the disclosed apparatus, the PMS further provides: the facility to tag footage of scenes with scene numbers to correspond with the imported 'shooting-script,' and tag successive camera takes of the scene in question as 'good,' 'print,' or 'discard', the facility to switch 'discard' or 'good' takes of a scene with "print" takes simply by using metadata tags and time code for assemblage into the rough-cut-timeline to be later ingested into an NLE system like Premier, Final Cut Pro, etc., the facility to fine tune, to trim, roll forward, or roll back on rough cuts before ingestion into an NLE system, thereby slashing editing time and overall post-production time drastically. A plurality of digital joysticks to control the attitude of the plurality of satellite cameras remotely is provided thereby saving the operator time walking back and forth to adjust cameras at the end of telescoping arms, as well as the facility to program repeatable action for the plurality of arms and tracking system semi-autonomously or robotically. Furthermore, the PMS provides the facility of the plurality of arms to double as a mini-jib either by motorizing the movement of the plurality of arms from the smart collar hub or by manual adjustment of the tension in the ball-joints connecting the plurality of arms to the smart collar hub, a jib-hinge attachment on top of the smart collar hub to which a light-weight boom or pocket jib may be attached for better sound or actual jib shots, and the functionality of the plurality of satellite cameras to automatically and independently track subjects, thereby negating the need for six eyeballs on three monitors, essentially making this a true one operator system with two digital/virtual assistant cameramen.

Further, the three-headed camera system may be used to shoot a scene on a set. Further, the scene may be a simple dinner-in-a-diner scene [FIGS. 29-35]. With one camera covering the scene, the camera needs to be moved at least three times for approximately fifteen takes for a variation of Master shot, Over the Shoulder Shot, Dirty Single Shot, Medium Close Up, Close up, Reaction Shot, Cut-Away, Cut-Ins, etc. This simple scene takes eight hours with one camera, or in the interest of time and keeping the actors fresh, an operator might resort to a three-camera shoot, requiring fewer takes with cameras running simultaneously. The three-headed camera system has a smaller footprint in a cramped space, i.e. smaller crew, less equipment, plus savings on time and money. Further, the actors aren't subjected to fifteen takes and 'composite' acting, i.e., multiple takes stitched together as one. Further, the actors are free to act organically with five or fewer takes.

With regards to color temperature, Tungsten for indoors, and daylight for outdoors, on a one-camera shoot, the interior is lit, the camera is white balanced for Tungsten, the exposure is set, and the camera is rolled when the actor is ready. Further, this set up could take thirty minutes for three seconds of screen time. After the setup, the exterior is lit, the camera is balanced for daylight, exposure is set, continuity is checked, the actor is out of make-up, and the camera is rolled. Further, this set up may take sixty minutes for six seconds of screen time. Consequently, between two takes the actor waited sixty minutes, and in total, it took ninety minutes to shoot nine seconds of screen time. Shooting like this may save money on equipment and crew size but the overall shooting takes a longer duration still, costing more money because, on a feature project with over two hundred scenes, this adds up and adds days to principal photography. On a three-camera shoot which presupposes a larger budget for three separate cameras, and three operators, the scene is shot continuously, negating the need for the actor's second trip to make-up, and negating the need for continuity checks because there wouldn't be any breaks as the actor steps from interior to exterior. Further, nine seconds of screen time is shot in thirty minutes. Further, the shooting of the scene gets faster, but at a steep price. On a shoot utilizing the three-headed camera system, the interior is lit, the interior satellite camera is white balanced for Tungsten, the exposure is set, and white balance and exposure are set simultaneously for the two exterior cameras. Further, nine seconds of screen time is shot in thirty minutes. Further, the shooting gets faster, saving time and money, and with a smaller footprint that is also perfect for social distancing where three or more angles are shot with one operator instead of six.

Figure 24:
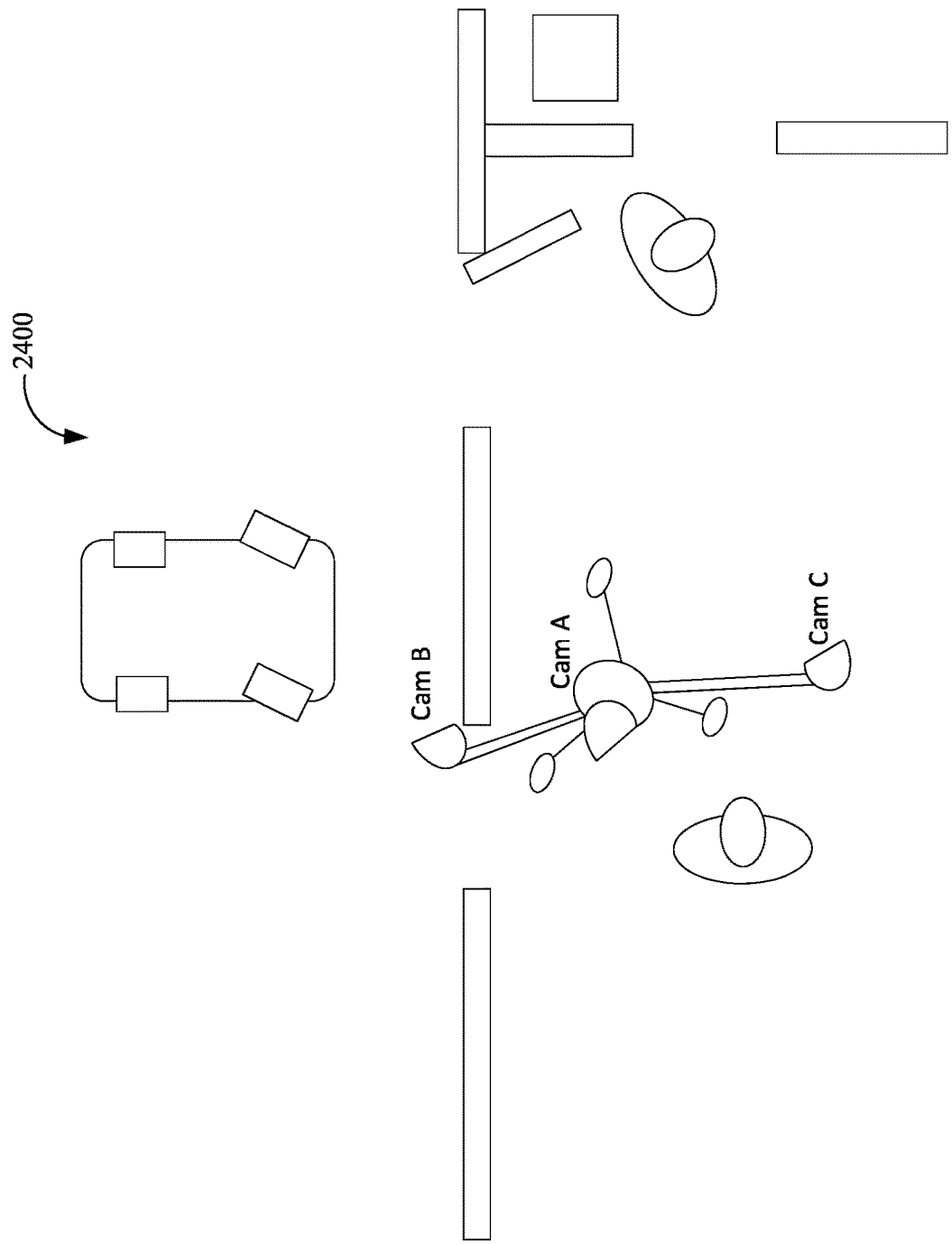
FIG. 24 is a top view of an audiovisual apparatus for facilitating multiple recordings from multiple viewpoints using multiple recording devices, in accordance with some embodiments.

Further, camera B covers an exterior shot of an actor arriving in a car and entering the house, [FIG. 24] while camera A shows an actor on the interior lying in wait, and camera C covers an interior shot of the actor entering the house.

Further, when placed on a dolly and track, and or if robotically and autonomously propelled, the three-headed camera system may be used for a tracking shot, and a follow shot simultaneously. Further, the three-headed camera system can cover actors from the exterior to the interior in the tracking shot and the follow shot. This is achieved by manually, semi-autonomously, or autonomously toggling between two preset camera settings for interior and exterior.

Shooting with the three-headed camera system immediately opens up a multitude of options. Further, [FIG. 25] the three-headed camera system both tracks and follows the actor in the interior. The main camera tracks the actor coming down the stairs at a ¾ angle, and the right satellite camera follows the actor, while the left satellite camera covers the actors arguing by the sink. To accomplish these shots with a one or three-camera setup requires more money and more time and more people. In endless setups, limited only by the filmmaker's imagination, time after time, the three-headed camera system saves money and time. Also, the three-headed camera system has a smaller footprint, and it keeps actors fresher with fewer takes and organic acting instead of composite acting.

Further, the three-headed camera system may boost live streaming and posting. With on set live switching via the mobile app, simply by tapping the appropriate camera, multiple angles can be live-streamed, or a rough cut may be assembled for later ingestion into a Non-Linear Editing (NLE) system. In other words, the moment a director says, "cut!" a rough cut of proxy files is ready for viewing or ingestion into an NLE system. Missing shots or shots that need to be re-shot or picked up can be picked up while the actors are still on set as opposed to dragging the actors back a few months later when the editor finally catches up and notes the errors and omissions. Thus, at the end of principal photography, when the production is wrapping up, the first cut of the entire feature film is quite possibly already assembled. Next step, fine tune and color grade. Not only does the three-headed camera system speed up production, but it will also leave its mark on post-production by giving an editor more organic cutting choices because there will be a synched angle available for any scene shot. For instance, on set, a CIA Analyst sits at the computer working away [FIGS. 20-23]. Further, camera A may be on her face in profile, alternately tilting up and down to also cover her hands as they work the keyboard, and camera B may be on the computer screen in an Over The Shoulder (OTS) shot or even closer. Further, Camera C covers the analyst's face in ¾. With three cameras rolling simultaneously, the three-headed camera system has every angle covered. All that is required is the tap-tap on the touch-screen application of the three-headed camera system, and the rough cut of the scene is assembled organically during the shoot; meaning the actor doesn't have to repeat actions exactly like they did in earlier takes for the sake of editing continuity. That's composite acting where the actor does the parts separately and it gets edited together to appear like it was all done organically, at once. With the three-headed camera system, if the operator has one good take, all three angles are available, and this means we don't have to shoot anything else to make the scene work. Actors can be more spontaneous and free. The three-headed camera system as conceived can make life easier for many departments. The three-headed camera system may not be the answer to everything on the set, but it does have its place, and it's a safe bet to say that it will be a workhorse on many productions for many years to come.

The disclosed apparatus generally relates to audiovisual recording devices. More specifically, the disclosed apparatus relates to a standalone system comprising a plurality of recording devices supported by a mobile, modular support structure.

Further, the present disclosure describes a camera system comprising a tripod structure with a main camera and satellite cameras mounted on telescopic arms. Further, the camera system may include a central hub.

Further, the present disclosure describes separating of camera components, and housing heavier components of the camera components on a tripod borne hub, then placing bare essential camera modules on telescoping arms. Further, this disclosure ameliorates the space, time, and money constraints, thereby enabling a single operator to shoot coverage simultaneously where space, time, and a budget might otherwise not permit. It further enables simultaneous shooting and live editing together of three angles, and additional multiples of three when units of the invention are daisy chained.

FIG. 1 is a top front perspective view of a standalone audiovisual apparatus 100 for the simultaneous acquisition and management of coverage, the simultaneous recording, and live on-the-fly editing of multiple angles, in accordance with some embodiments. Further, the audiovisual apparatus 100 may be configured for supporting the multiple recording devices. Further, the audiovisual apparatus 100 may include a body 102 and a plurality of arms 104-106.

Further, the body 102 may include an upper body portion 108 and a lower body portion 110-114. Further, the upper body portion 108 may include at least one body adapter 116 disposed on the upper body portion 108. Further, the at least one body adapter 116 may be configured for detachably attaching at least one primary recording device 126 to the at least one body adapter 116. Further, the at least one body adapter 116 may be configured for removably mounting the at least one primary recording device 126 on the at least one body adapter 116. Further, the lower body portion 110-114 may be disposable on at least one surface. Further, the at least one surface may include a ground surface. Further, the lower body portion 110-114 may be configured for positioning the audiovisual apparatus 100 in at least one position. Further, the positioning of the audiovisual apparatus 100 positions the at least one primary recording device 126 in at least one primary recording position. Further, the at least one primary recording device 126 may include at least one main camera. Further, the at least one primary recording position may include at least one main viewpoint. Further, the at least one main viewpoint may include at least one main camera angle. Further the at least one main camera angle may include a high-angle shot, a low-angle shot, a bird's-eye view, and a worm's-eye view. Further, the at least one primary recording device 126 may include an audiovisual recording device.

Further, the plurality of arms 104-106 may be coupled to the body 102. Further, the plurality of arms 104-106 extends away from the body 102. Further, a first arm end 122 of each of the plurality of arms 104-106 may be attached to the upper body portion 108. Further, the plurality of arms 104-106 may include a plurality of arm adapters 118-120. Further, an arm adapter of the plurality of arm adapters 118-120 may be comprised in a second arm end 124 of each of the plurality of arms 104-106. Further, the plurality of arm adapters 118-120 may be configured for detachably attaching a plurality of secondary recording devices to the plurality of arm adapters 118-120. Further, the plurality of arm adapters 118-120 may be configured for removably mounting the plurality of secondary recording devices on the plurality of arm adapters 118-120. Further, the plurality of arms 104-106 may be configured for moving between a plurality of arm positions in relation to the body 102 for positioning the plurality of secondary recording devices in a plurality of secondary recording positions. Further, the plurality of secondary recording devices may include a plurality of satellite cameras. Further, the plurality of secondary recording positions may include a plurality of satellite viewpoints. Further, the plurality of satellite viewpoints may include a plurality of satellite camera angles. Further, the plurality of satellite camera angles may include a high-angle shot, a low-angle shot, a bird's-eye view, and a worm's-eye view. Further, the plurality of secondary recording devices may include audiovisual recording devices.

Further, in some embodiments, the plurality of secondary recording devices may include at least one of a plurality of microphones and a plurality of lighting devices. Further, the plurality of arm adapters 118-120 may be configured for detachably attaching the at least one of the plurality of microphones and the plurality of lighting devices to the plurality of arm adapters 118-120.

Further, in some embodiments, the upper body portion 108 may be movably attached to the lower body portion 110-114. Further, the upper body portion 108 may be configured for rotating between a plurality of upper body positions in relation to the lower body portion 110-114 around at least one body axis of the upper body portion 108 in the at least one position of the audiovisual apparatus 100. Further, the rotating further positions the at least one primary recording device 126 in the at least one primary recording position.

Further, in some embodiments, the upper body portion 108 may be removably attached to the lower body portion 110-114.

Further, in some embodiments, the at least one body adapter 116 may be configured for rotating the at least one primary recording device 126 around at least one of three mutually perpendicular primary axes of the at least one primary recording device 126. Further, the rotating orients the at least one primary recording device 126 in at least one primary orientation.

Further, in some embodiments, the plurality of arm adapters 118-120 may be configured for rotating the plurality of secondary recording devices around at least one of three mutually perpendicular secondary axes of the plurality of secondary recording devices. Further, the rotating orients the plurality of secondary recording devices in at least one secondary orientation. Further, in an embodiment, the plurality of arm adapters 118-120 may include a plurality of suppressing assemblies. Further, the plurality of suppressing assemblies may be coupled with the plurality of secondary recording devices. Further, the plurality of suppressing assemblies may be configured of suppressing a rotation of the plurality of secondary recording devices around at least one of the three mutually perpendicular secondary axes of the plurality of secondary recording devices based on the moving of the plurality of arms 104-106 between the plurality of arm positions. Further, in an embodiment, the plurality of suppressing assemblies may be configured for suppressing at least one rotation of the plurality of secondary recording devices around at least one secondary axis of the three mutually perpendicular secondary axes based on the rotation of the plurality of secondary recording devices around at least two of the three mutually perpendicular secondary axes. Further, the plurality of suppressing assemblies may include a plurality of gyroscopic three-axis gimbals.

Further, in some embodiments, the plurality of arms 104-106 may be rotatably coupled to the body 102. Further, the moving may include rotating the plurality of arms 104-106 around at least one arm axis of the plurality of arms 104-106 between the plurality of arm positions. Further, the positioning of the plurality of secondary recording devices in the plurality of secondary recording positions may be based on the rotating of the plurality of arms 104-106.

Further, in some embodiments, the plurality of arms 104-106 may be extendably coupled to the body 102. Further, the moving may include retractably extending the plurality of arms 104-106 between the plurality of arm positions. Further, the positioning of the plurality of secondary recording devices in the plurality of secondary recording positions may be based on the retractably extending of the plurality of arms 104-106.

Further, in some embodiments, an arm of the plurality of arms 104-106 may include a telescopic body. Further, a first end of the telescopic body may be attached to the upper body portion 108. Further, the arm adapter may be comprised in a second end of the telescopic body. Further, the telescopic body may be configured for retractably extending and rotating the arm between the plurality of arm positions for the positioning of the plurality of secondary recording devices in the plurality of secondary recording positions.

Figure 14:
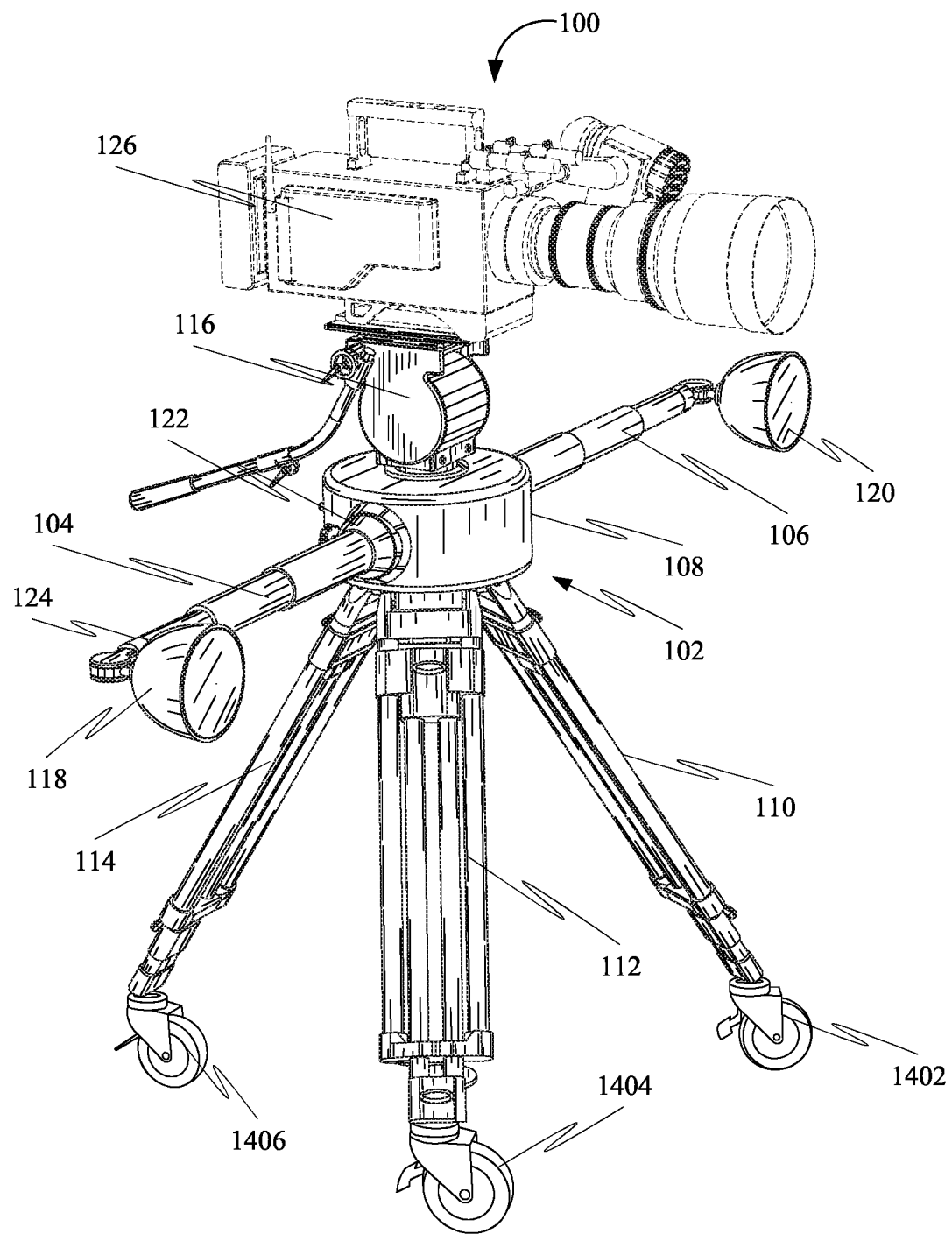
FIG. 14 is a top front perspective view of the audiovisual apparatus with the plurality of wheels, in accordance with some embodiments.

Further, in some embodiments, the lower body portion 110-114 may include a plurality of wheels 1402-1406, as shown in FIG. 14, disposed on the lower body portion 110-114. Further, the plurality of wheels 1402-1406 may be configured for movably disposing the lower body portion 110-114 on the at least one surface. Further, the positioning of the audiovisual apparatus 100 in the at least one position may be based on the movably disposing of the lower body portion 110-114.

Further, in some embodiments, the lower body portion 110-114 may include a plurality of legs. Further, the plurality of legs forms a tripod structure. Further, a first leg end of each of the plurality of legs may be attached to the upper body portion 108. Further, a second leg end of each of the plurality of legs may be disposable on the at least one surface. Further, the plurality of legs may be configured for moving between a plurality of leg positions. Further, the positioning of the audiovisual apparatus 100 in the at least one position may be based on the moving of the plurality of legs between the plurality of leg positions. Further, in an embodiment, a leg of the plurality of legs may include a telescopic body. Further, a first end of the telescopic body may be attached to the upper body portion 108. Further, a second end of the telescopic body may be disposable on the at least one surface. Further, the telescopic body may be configured for at least one of retractably extending and rotating the leg between the plurality of leg positions.

Figure 11:
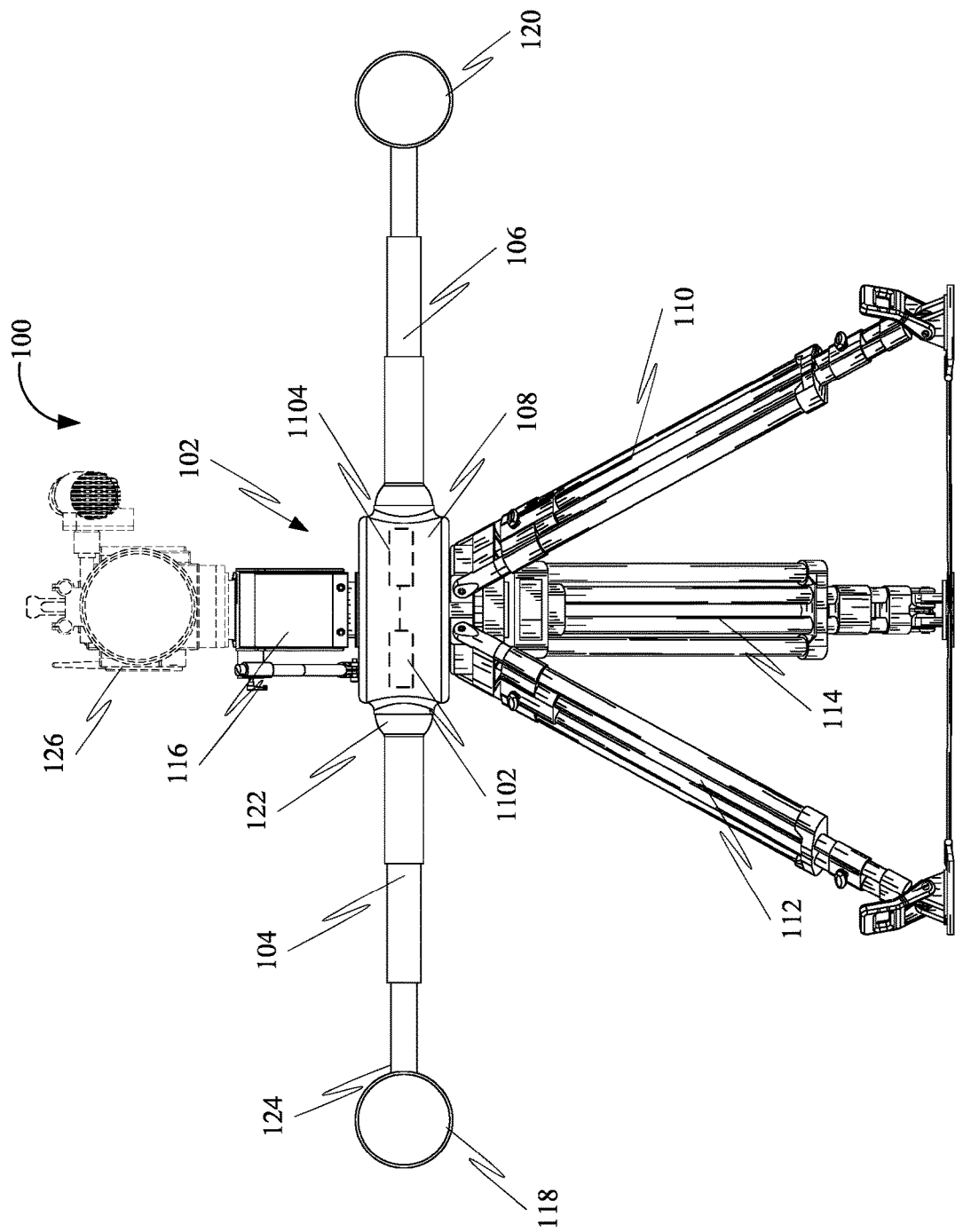
FIG. 11 is a front view of the audiovisual apparatus, in accordance with some embodiments.
Figure 12:
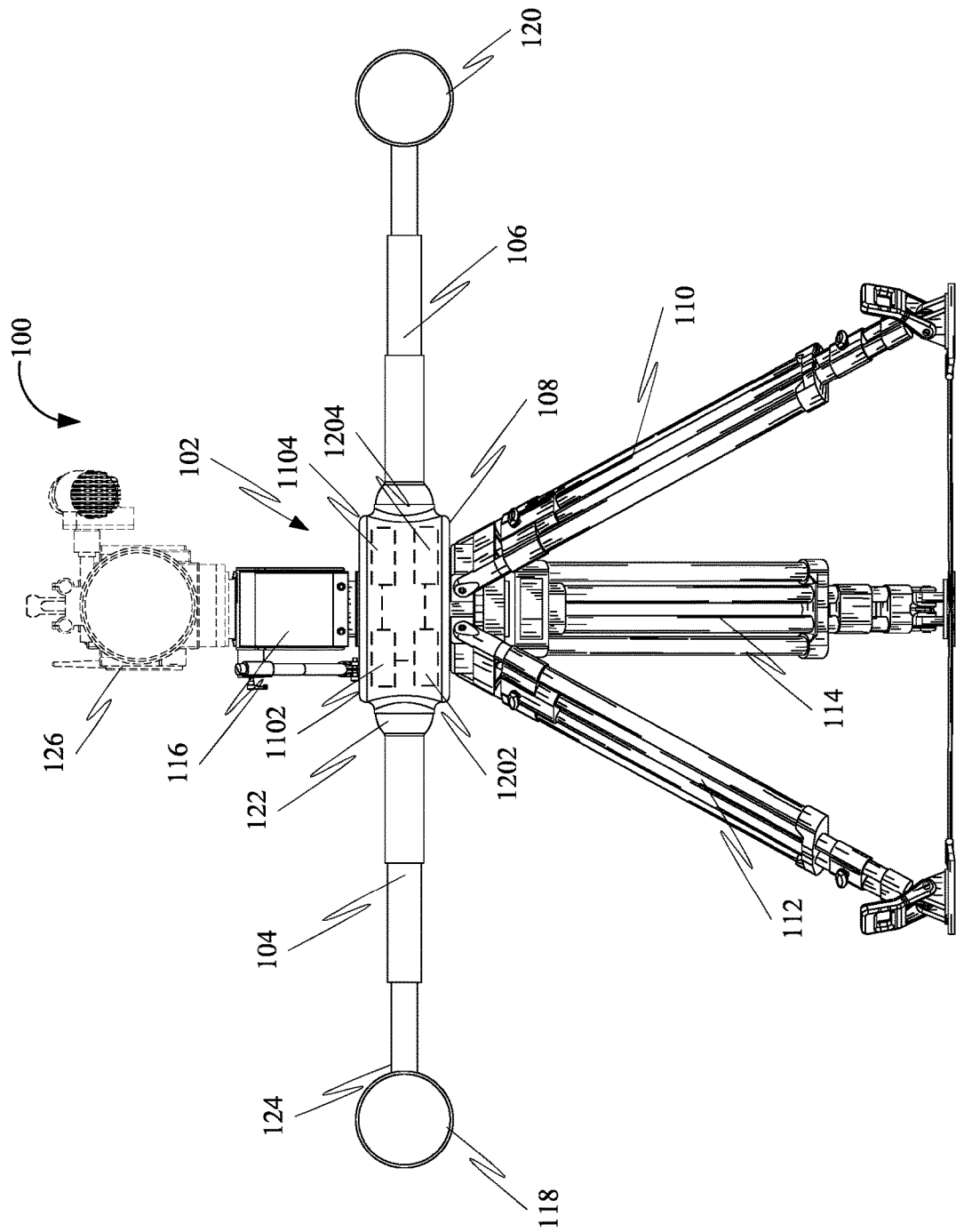
FIG. 12 is a front view of the audiovisual apparatus, in accordance with some embodiments.

In further embodiments, the audiovisual apparatus 100 may include a memory device 1102 and a communication device 1104, as shown in FIG. 11. Further, the memory device 1102 may include SSD. Further, the memory device 1102 may be disposed in the body 102. Further, the memory device 1102 may be communicatively coupled with at least one of the at least one primary recording device 126 and the plurality of secondary recording devices using at least one of a wired communication channel and a wireless communication channel. Further, the at least one primary recording device 126 generates at least one primary data. Further, the plurality of secondary recording devices generates a plurality of secondary data. Further, the memory device 1102 may be configured for storing at least one of the at least one primary data and the plurality of secondary data. Further, the communication device 1104 may be disposed in the body 102. Further, the communication device 1104 may be communicatively coupled with the memory device 1102. Further, the communication device 1104 may be configured for transmitting the at least one of the at least one primary data and the plurality of secondary data to at least one user device (such as the mobile device 2706, the electronic devices 2710, etc.). Further, in an embodiment, the audiovisual apparatus 100 may include a controller 1202 and a plurality of first actuators 1204, as shown in FIG. 12. Further, the controller 1202 may be disposed in the body 102. Further, the controller 1202 may be communicatively coupled with the memory device 1102. Further, the controller 1202 may be configured for analyzing the at least one of the at least one primary data and the plurality of secondary data using at least one artificial intelligence model. Further, the controller 1202 may be configured for generating a first command based on the analyzing. Further, the plurality of first actuators 1204 may be communicatively coupled with the controller 1202. Further, the plurality of first actuators 1204 may be operationally coupled with the plurality of arms 104-106. Further, the plurality of first actuators 1204 may be configured for moving the plurality of arms 104-106 between the plurality of arm positions based on the first command.

Figure 13:
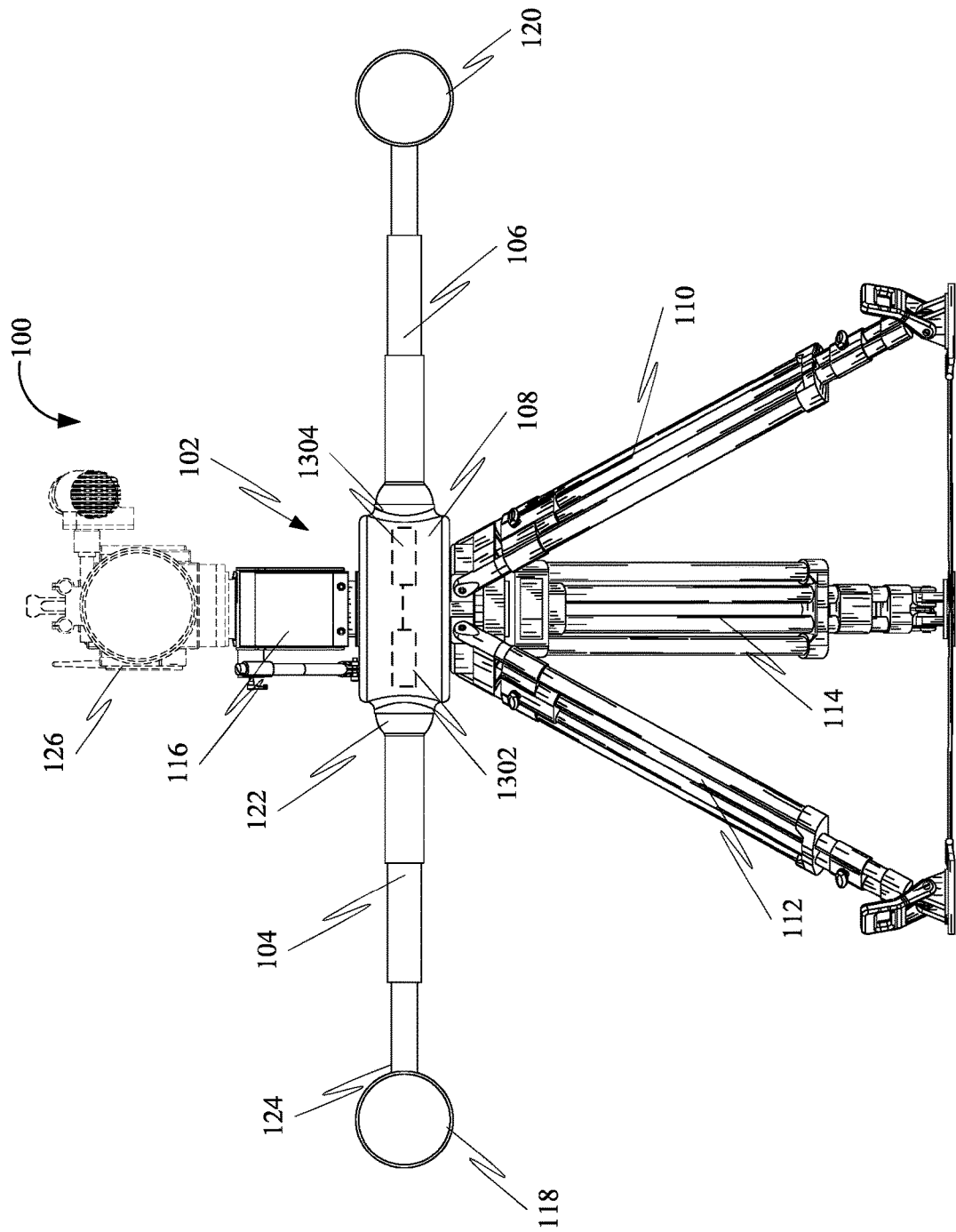
FIG. 13 is a front view of the audiovisual apparatus, in accordance with some embodiments.

In further embodiments, the audiovisual apparatus 100 may include a controller 1302 and a plurality of actuators 1304, as shown in FIG. 13. Further, the controller 1302 may be disposed in the body 102. Further, the controller 1302 may be configured for receiving at least one input data from at least one input device. Further, the controller 1302 may be configured for analyzing the at least one input data. Further, the controller 1302 may be configured for generating a command based on the analyzing. Further, the plurality of actuators 1304 may be communicatively coupled with the controller 1302. Further, the plurality of actuators 1304 may be operationally coupled with the plurality of arms 104-106. Further, the plurality of actuators 1304 may be configured for moving the plurality of arms 104-106 between the plurality of arm positions based on the command.

Further, in some embodiments, the audiovisual apparatus 100 may include at least one power source. Further, the at least one power source may be coupled with the at least one primary recording device 126 and the plurality of secondary recording devices. Further, the at least one power source may be configured for powering at least one of the at least one primary recording device 126 and the plurality of secondary recording devices based on the detachably attaching of the at least one primary recording device 126 and the plurality of secondary recording devices. Further, the at least one power source may include at least one battery.

Figure 2:
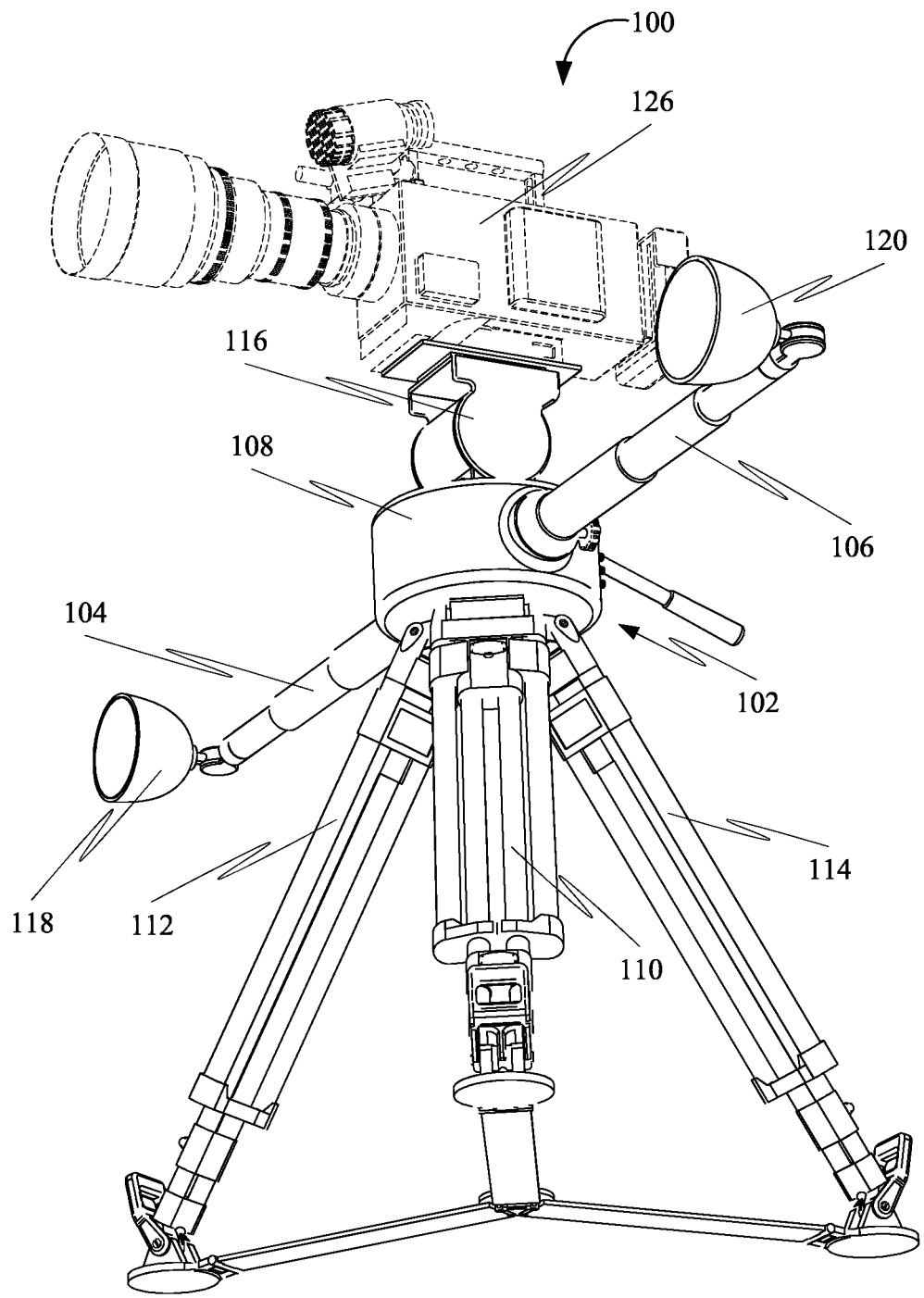
FIG. 2 is a bottom front perspective view of the audiovisual apparatus, in accordance with some embodiments.

FIG. 2 is a bottom front perspective view of the audiovisual apparatus 100, in accordance with some embodiments.

Figure 3:
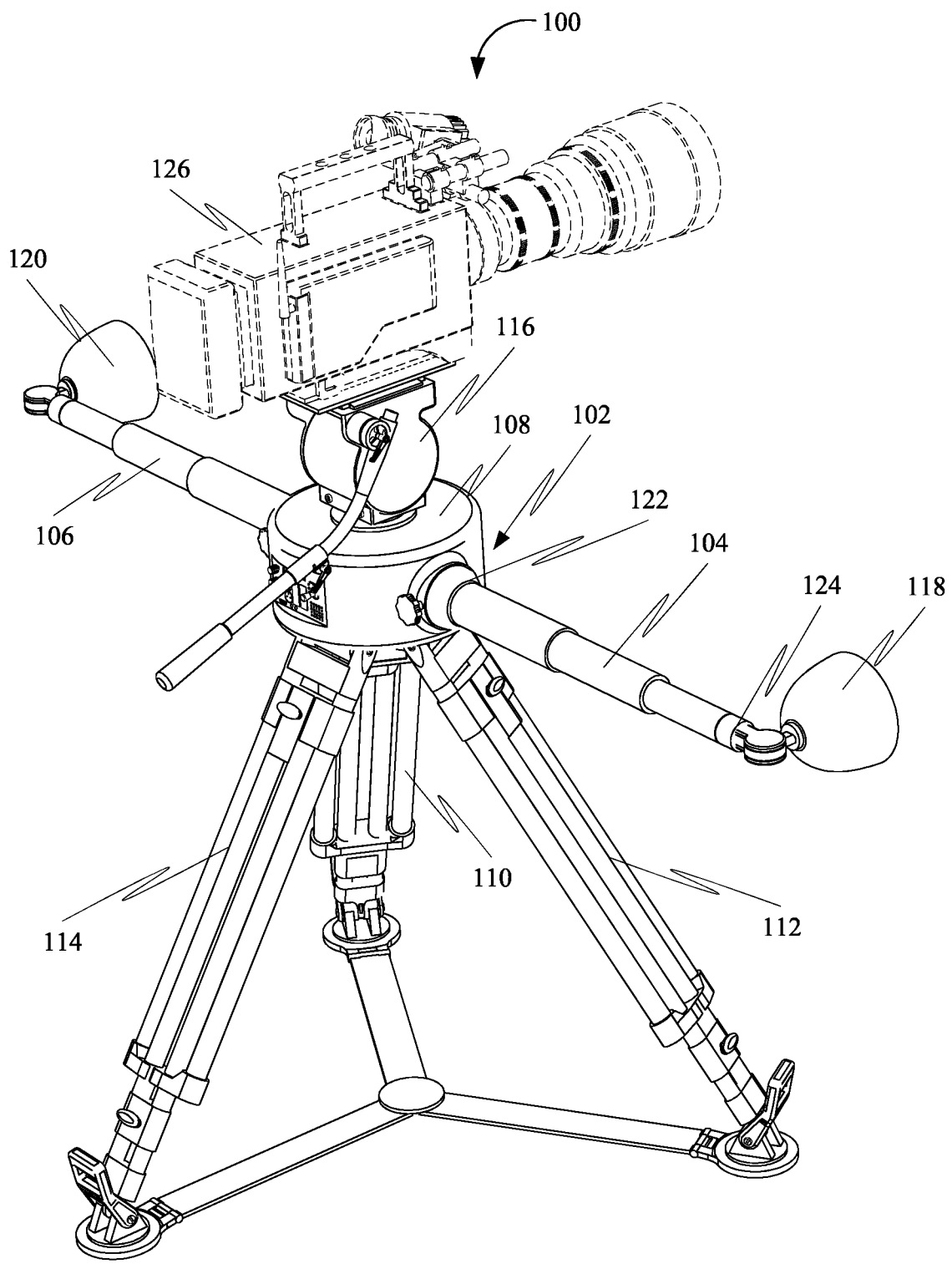
FIG. 3 is a top rear perspective view of the audiovisual apparatus, in accordance with some embodiments.

FIG. 3 is a top rear perspective view of the audiovisual apparatus 100, in accordance with some embodiments.

Figure 4:
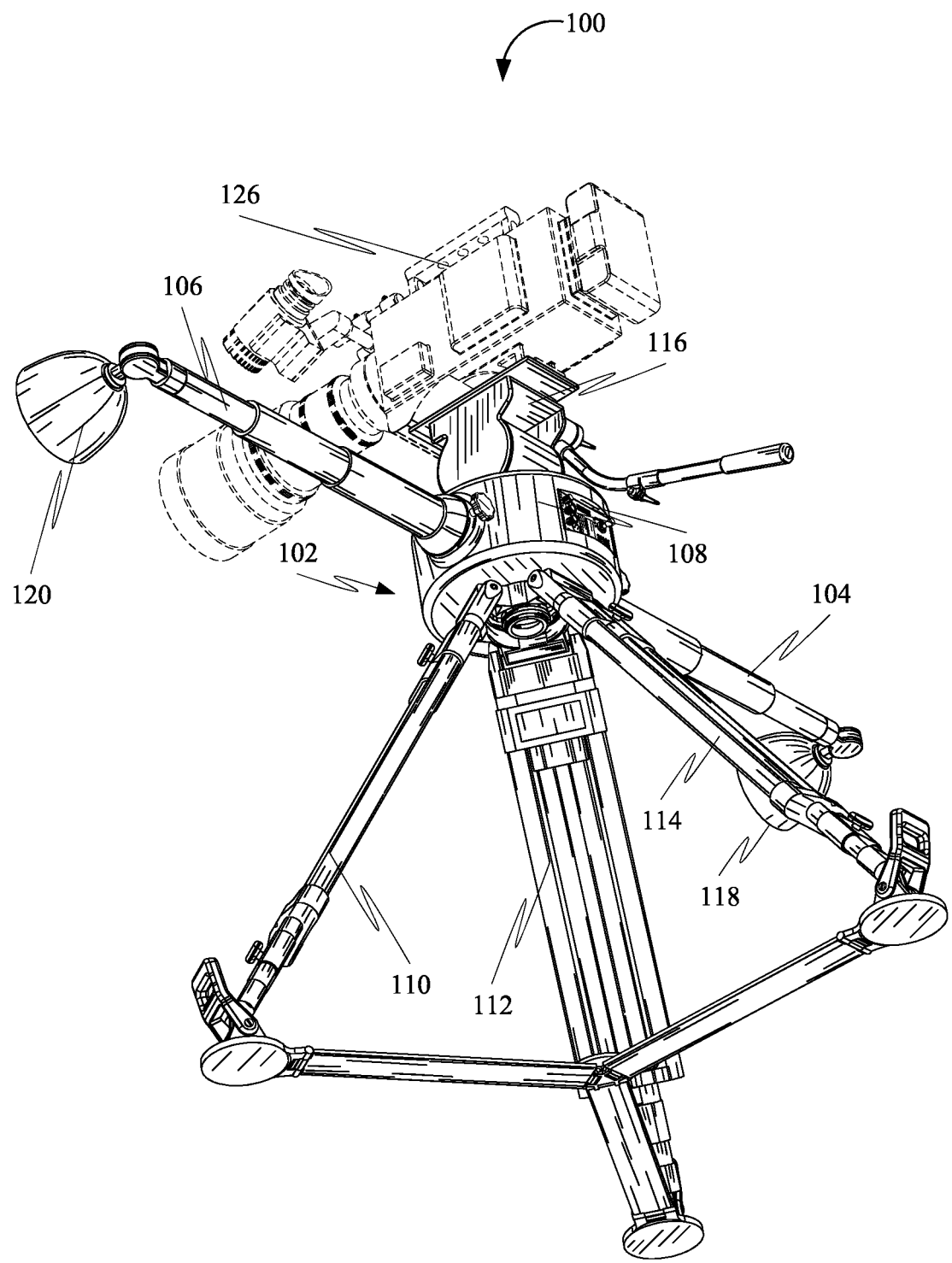
FIG. 4 is a bottom rear perspective of the audiovisual apparatus, in accordance with some embodiments.

FIG. 4 is a bottom rear perspective of the audiovisual apparatus 100, in accordance with some embodiments.

Figure 5:
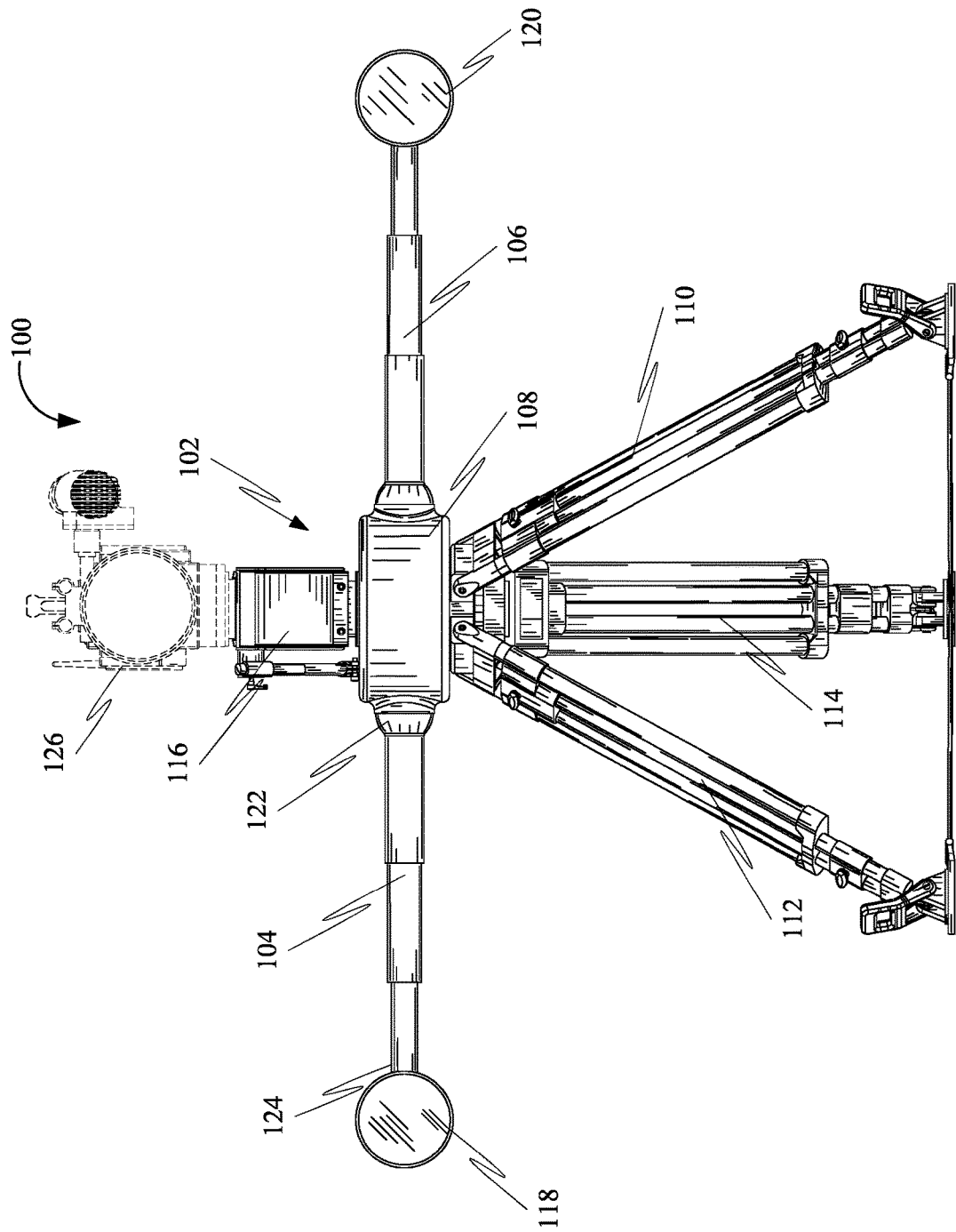
FIG. 5 is a front view of the audiovisual apparatus, in accordance with some embodiments.

FIG. 5 is a front view of the audiovisual apparatus 100, in accordance with some embodiments.

Figure 6:
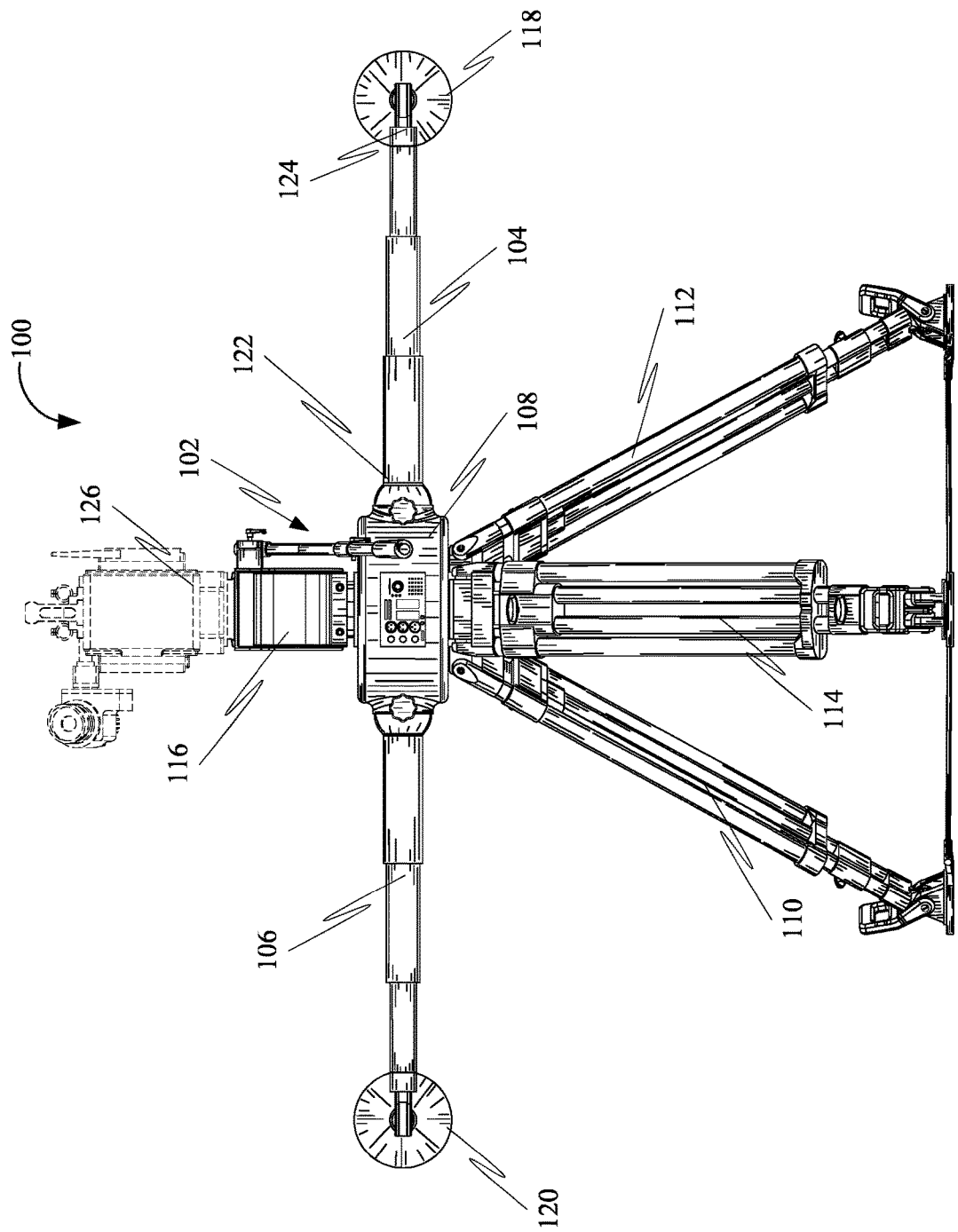
FIG. 6 is a rear view of the audiovisual apparatus, in accordance with some embodiments.

FIG. 6 is a rear view of the audiovisual apparatus 100, in accordance with some embodiments.

Figure 7:
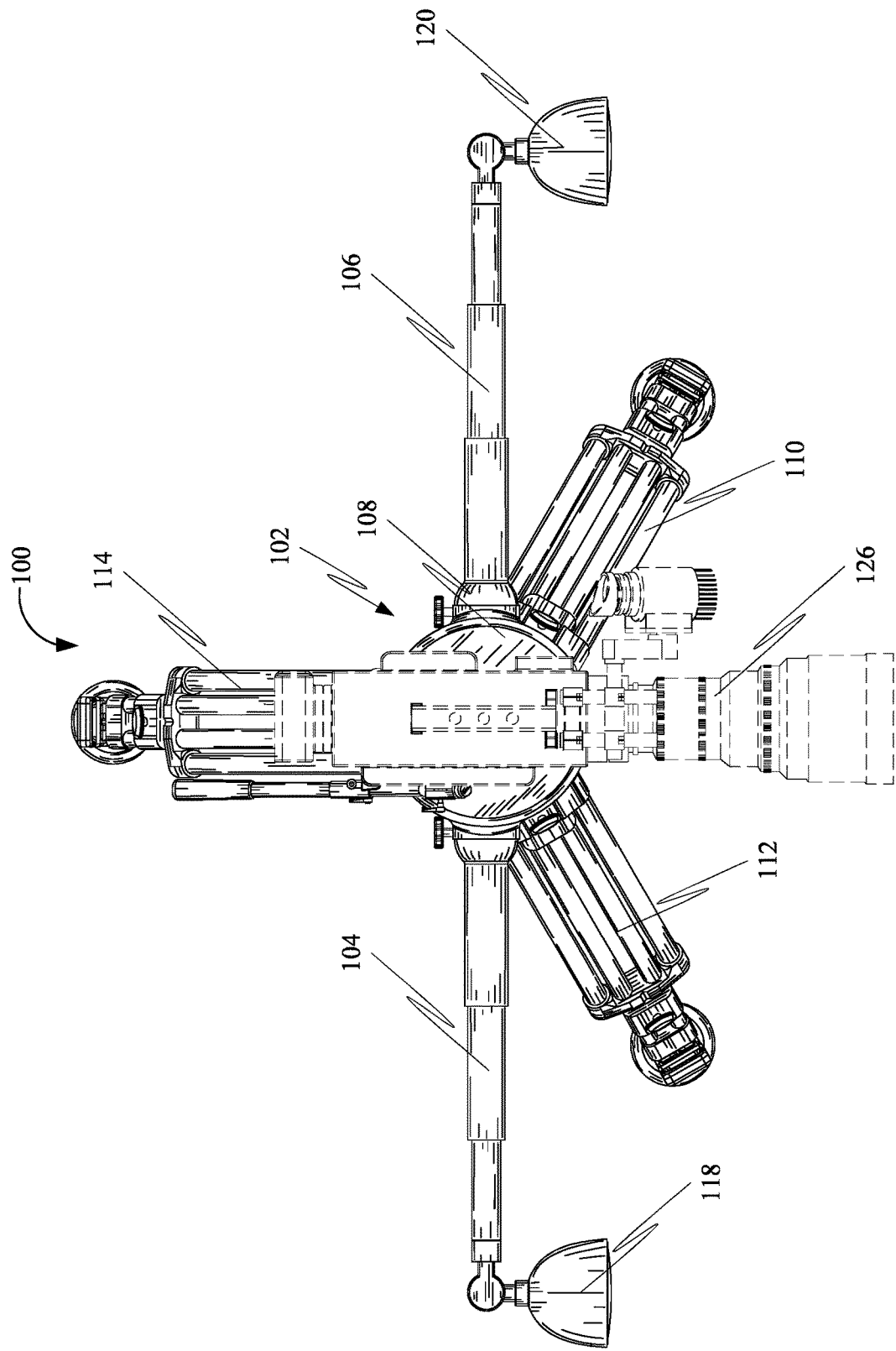
FIG. 7 is a top view of the audiovisual apparatus, in accordance with some embodiments.

FIG. 7 is a top view of the audiovisual apparatus 100, in accordance with some embodiments.

Figure 8:
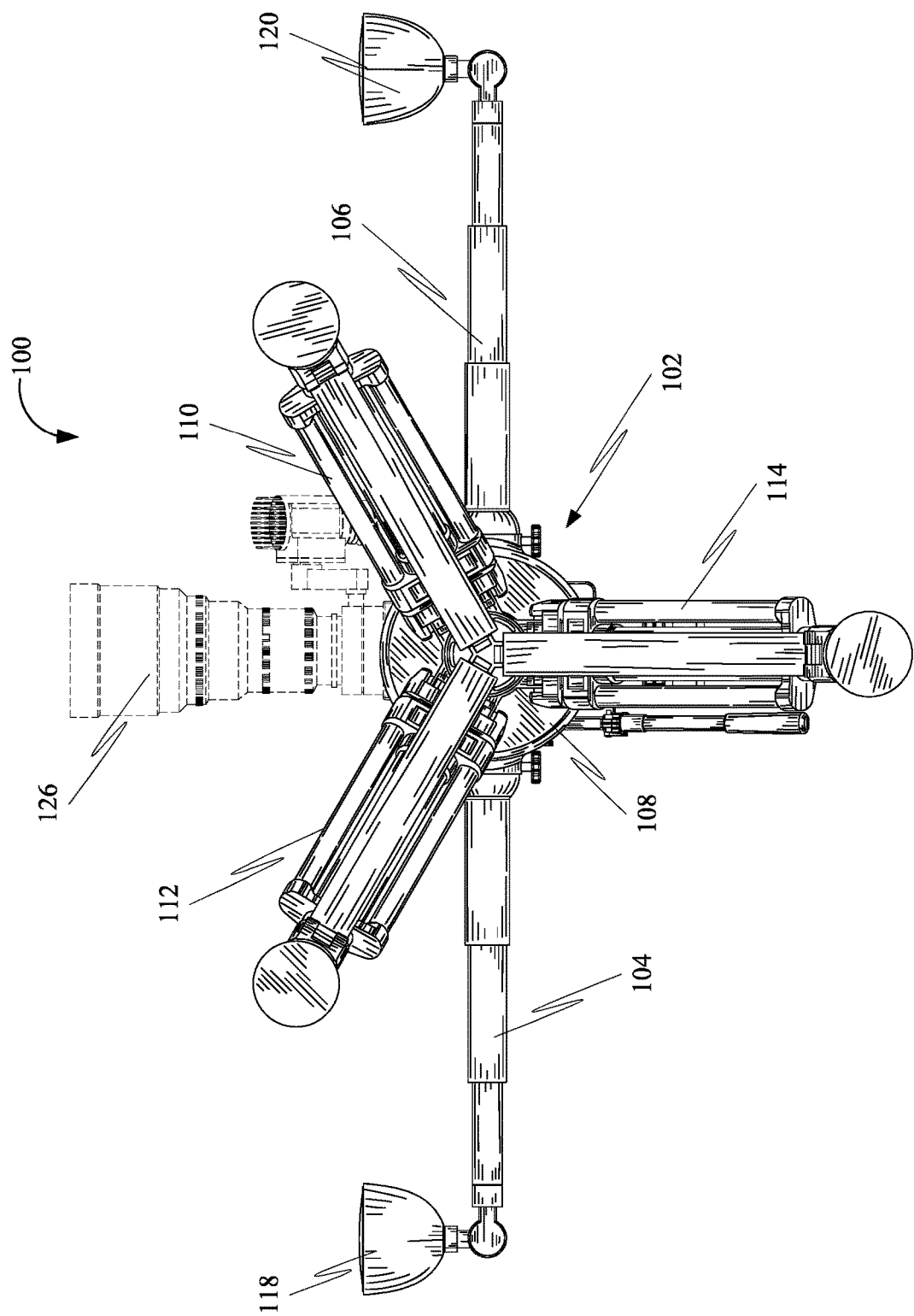
FIG. 8 is a bottom view of the audiovisual apparatus, in accordance with some embodiments.

FIG. 8 is a bottom view of the audiovisual apparatus 100, in accordance with some embodiments.

Figure 9:
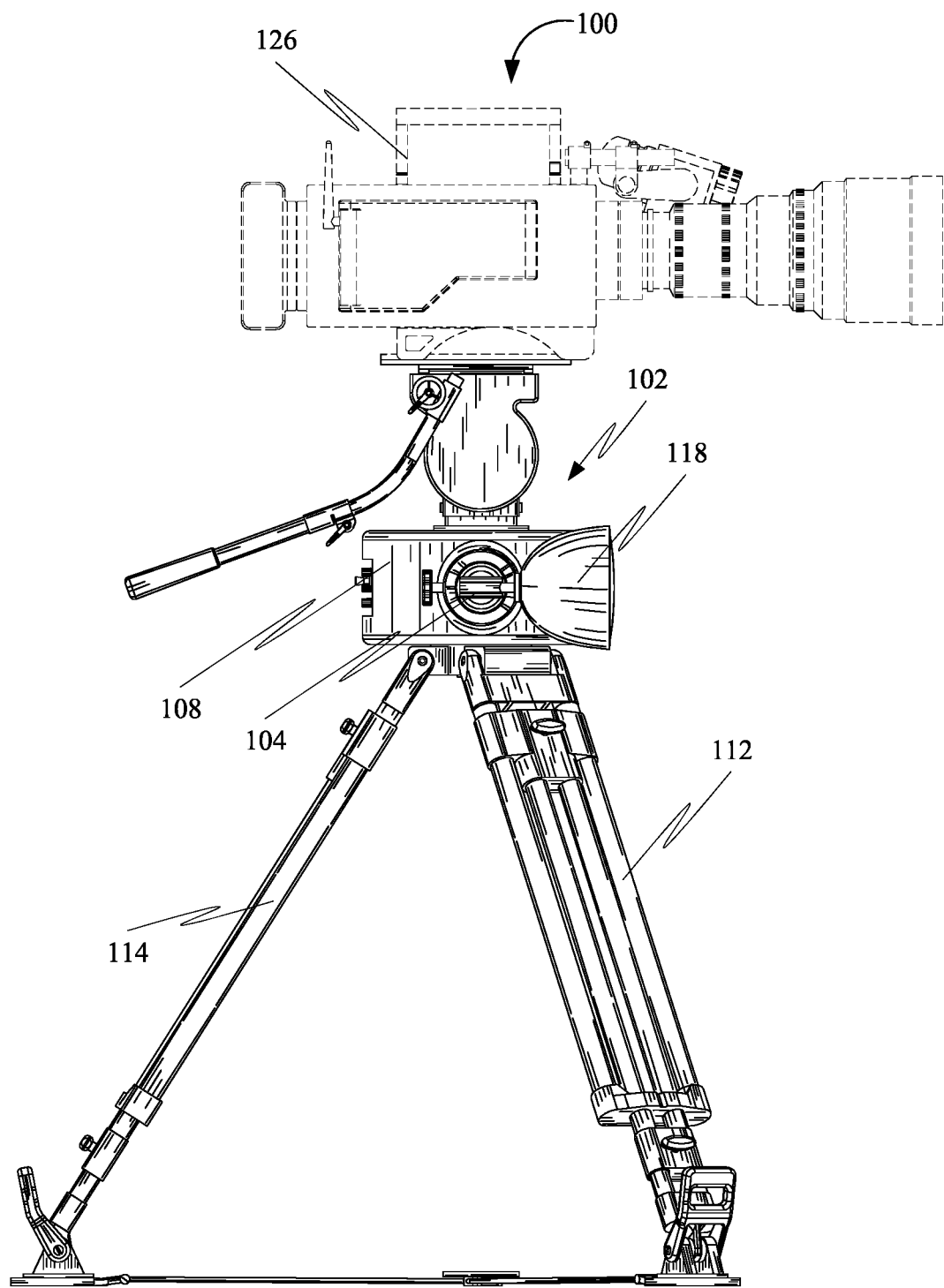
FIG. 9 is a right side view of the audiovisual apparatus, in accordance with some embodiments.

FIG. 9 is a right side view of the audiovisual apparatus 100, in accordance with some embodiments.

Figure 10:
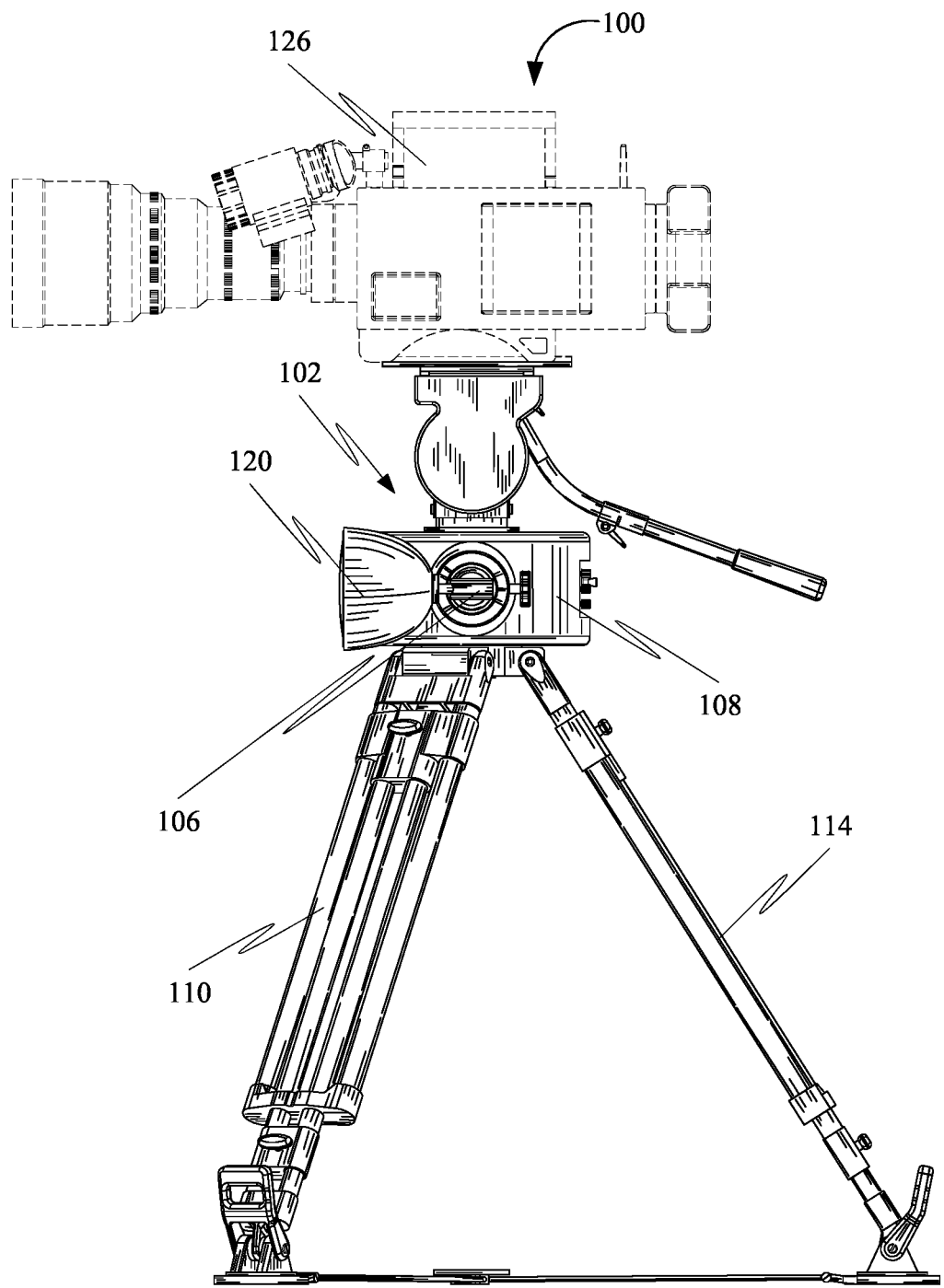
FIG. 10 is a left side view of the audiovisual apparatus, in accordance with some embodiments.

FIG. 10 is a left side view of the audiovisual apparatus 100, in accordance with some embodiments.

FIG. 11 is a front view of the audiovisual apparatus 100, in accordance with some embodiments.

FIG. 12 is a front view of the audiovisual apparatus 100, in accordance with some embodiments.

FIG. 13 is a front view of the audiovisual apparatus 100, in accordance with some embodiments.

FIG. 14 is a top front perspective view of the audiovisual apparatus 100 with the plurality of wheels 1402-1406, in accordance with some embodiments.

Figure 15:
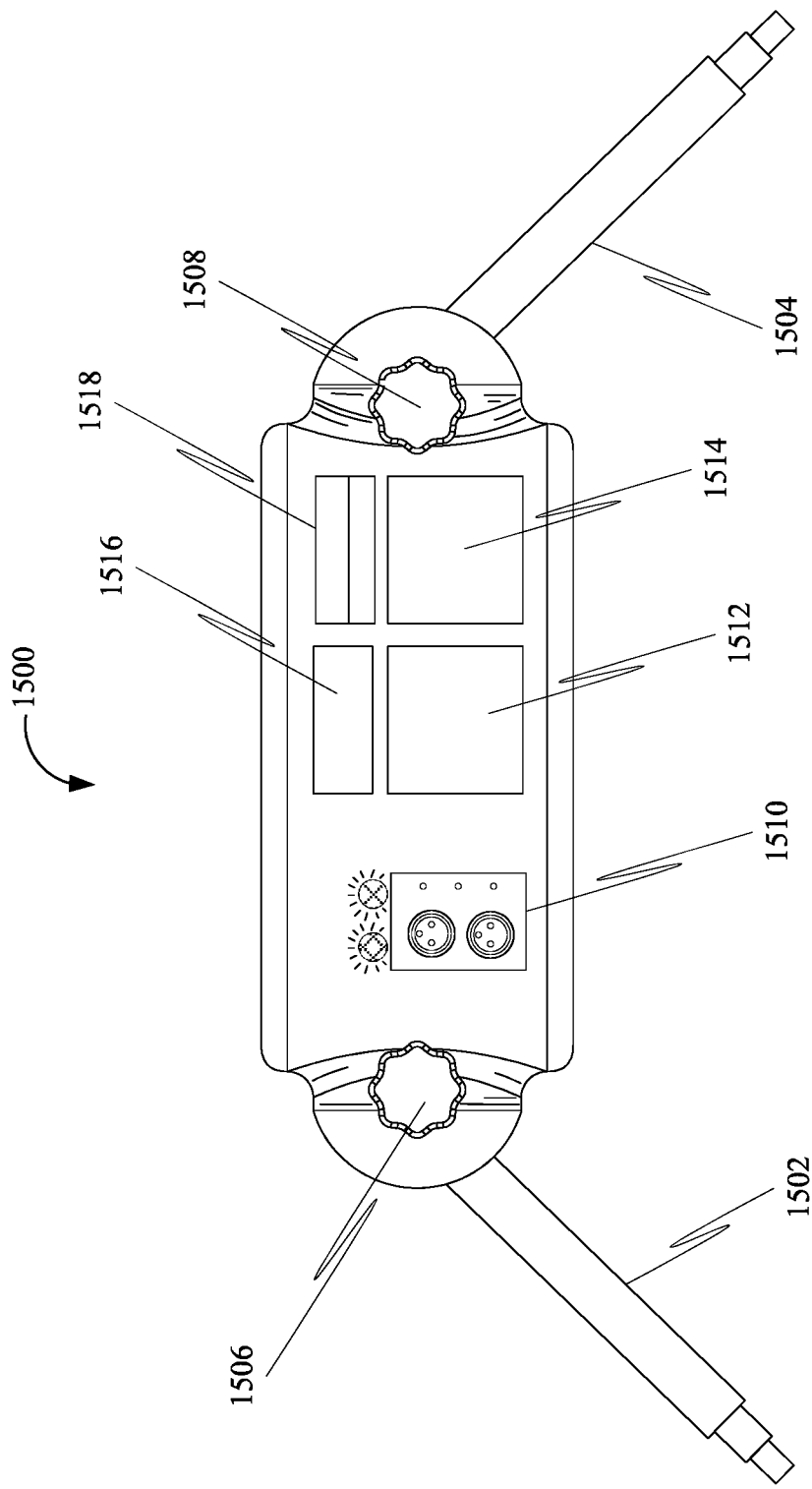
FIG. 15 is a rear view of a smart collar hub of an audiovisual apparatus, in accordance with some embodiments.

FIG. 15 is a rear view of a smart collar hub 1500 of an audiovisual apparatus, in accordance with some embodiments. Further, the smart collar hub 1500 may include a plurality of extension arms 1502-1504 coupled to the smart collar hub 1500 using a plurality of tension knobs 1506-1508. Further, the smart collar hub 1500 may include an audio panel 1510. Further, the audio panel 1510 may include three pin XLR gain knobs. Further, the smart collar hub 1500 may include a plurality of battery slots 1512-1514. Further, the smart collar hub 1500 may include a wireless receiver slot 1516. Further, the smart collar hub 1500 may include a SSD slot 1518.

Figure 16:
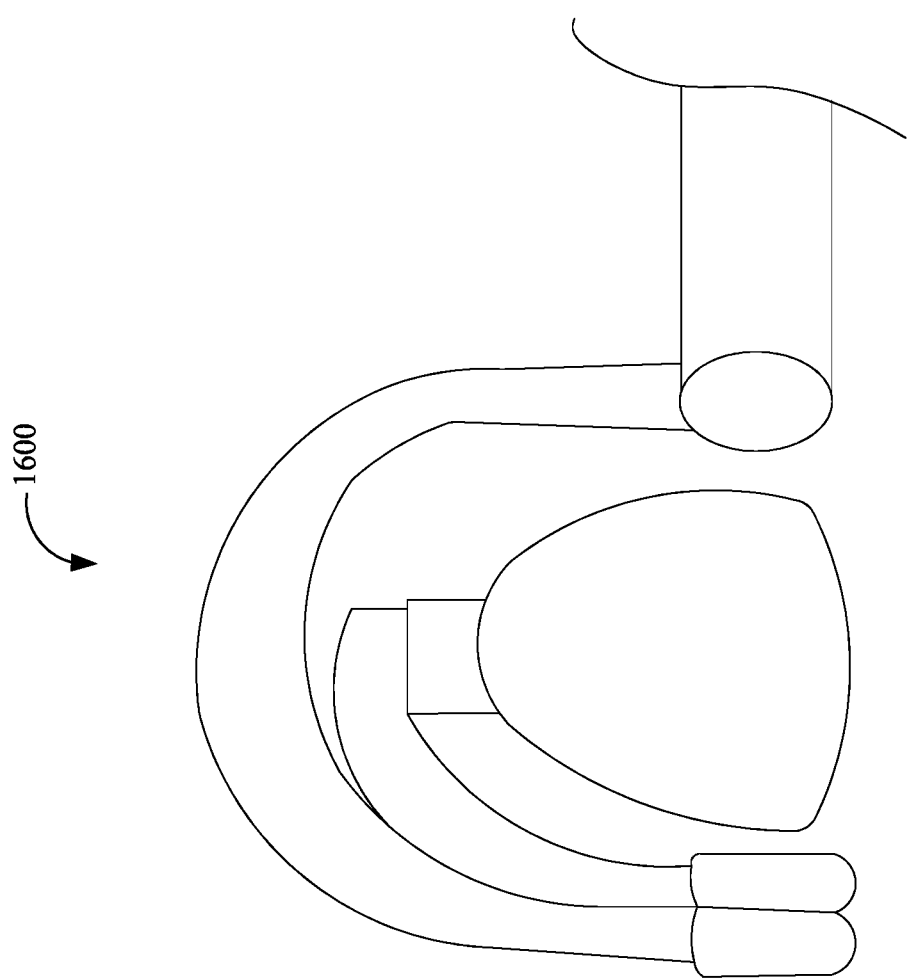
FIG. 16 is a top view of an adapter of the audiovisual apparatus, in accordance with some embodiments.

FIG. 16 is a top view of an adapter 1600 of the audiovisual apparatus, in accordance with some embodiments.

Figure 17:
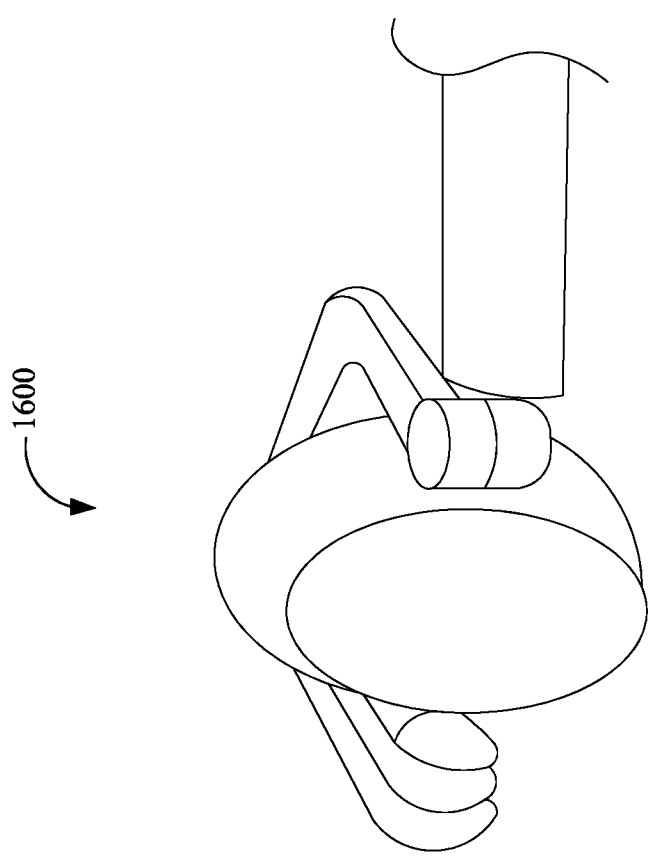
FIG. 17 is a perspective view of the adapter of the audiovisual apparatus, in accordance with some embodiments
Figure 18:
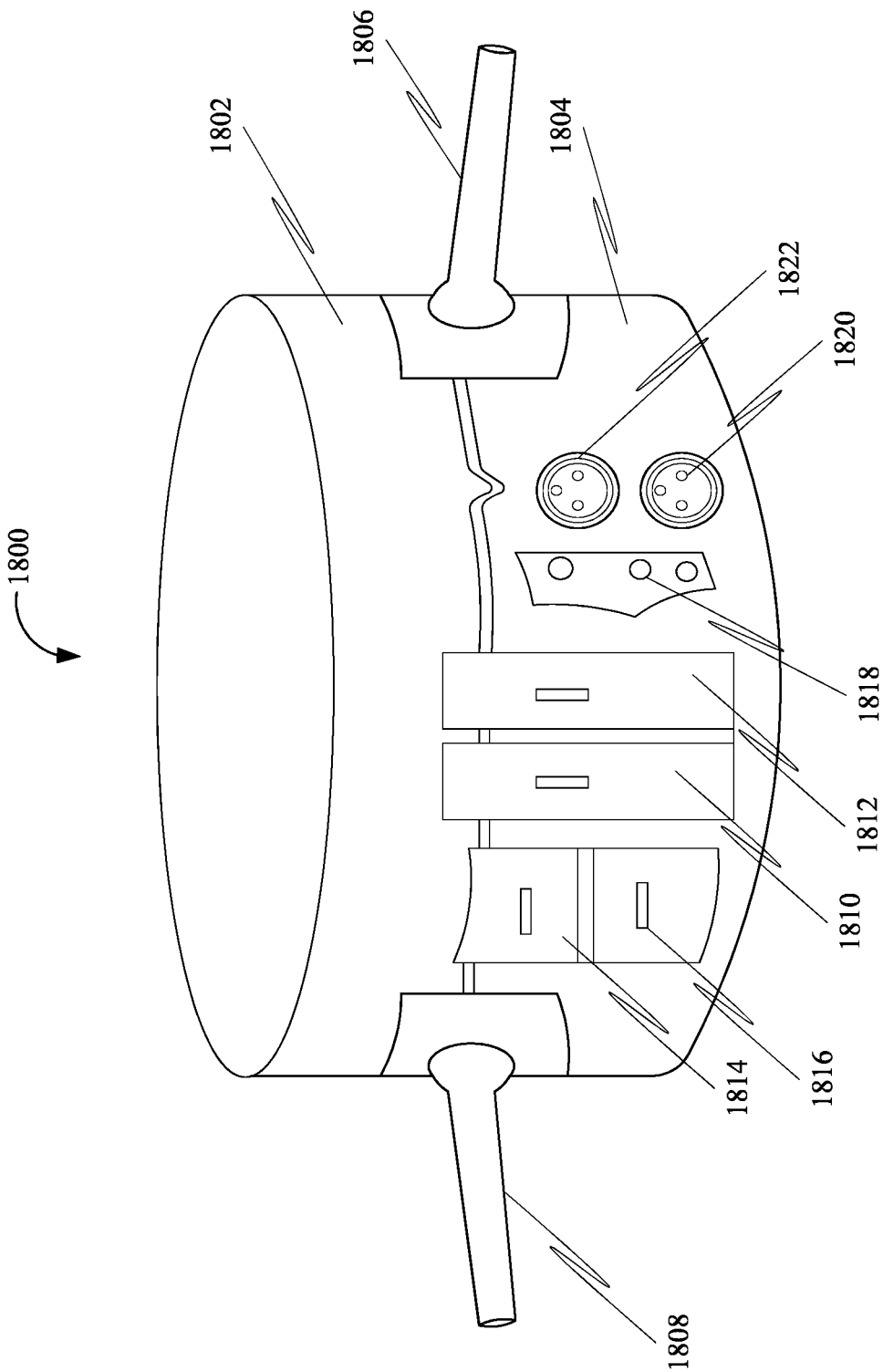
FIG. 18 is a rear perspective view of a smart collar hub of the audiovisual apparatus, in accordance with some embodiments.

FIG. 17 is a perspective view of the adapter 1600 of the audiovisual apparatus, in accordance with some embodiments FIG. 18 is a rear perspective view of a smart collar hub 1800 of the audiovisual apparatus, in accordance with some embodiments. Further, the smart collar hub 1800 may include an upper hub portion 1802 and a lower hub portion 1804. Further, the upper hub portion 1802 may be detachably attached to the lower hub portion 1804 forming the smart collar hub 1800. Further, the smart collar hub 1800 may include a plurality of extension arms 1806-1808. Further, the smart collar hub 1800 may include a plurality of power bank slots 1810-1812. Further, the smart collar hub 1800 may include a plurality of data cards slots 1814-1816. Further, the smart collar hub 1800 may include a TRS/headphone jack 1818. Further, the smart collar hub 1800 may include a plurality of three pin XLRs 1820-1822.

Figure 19:
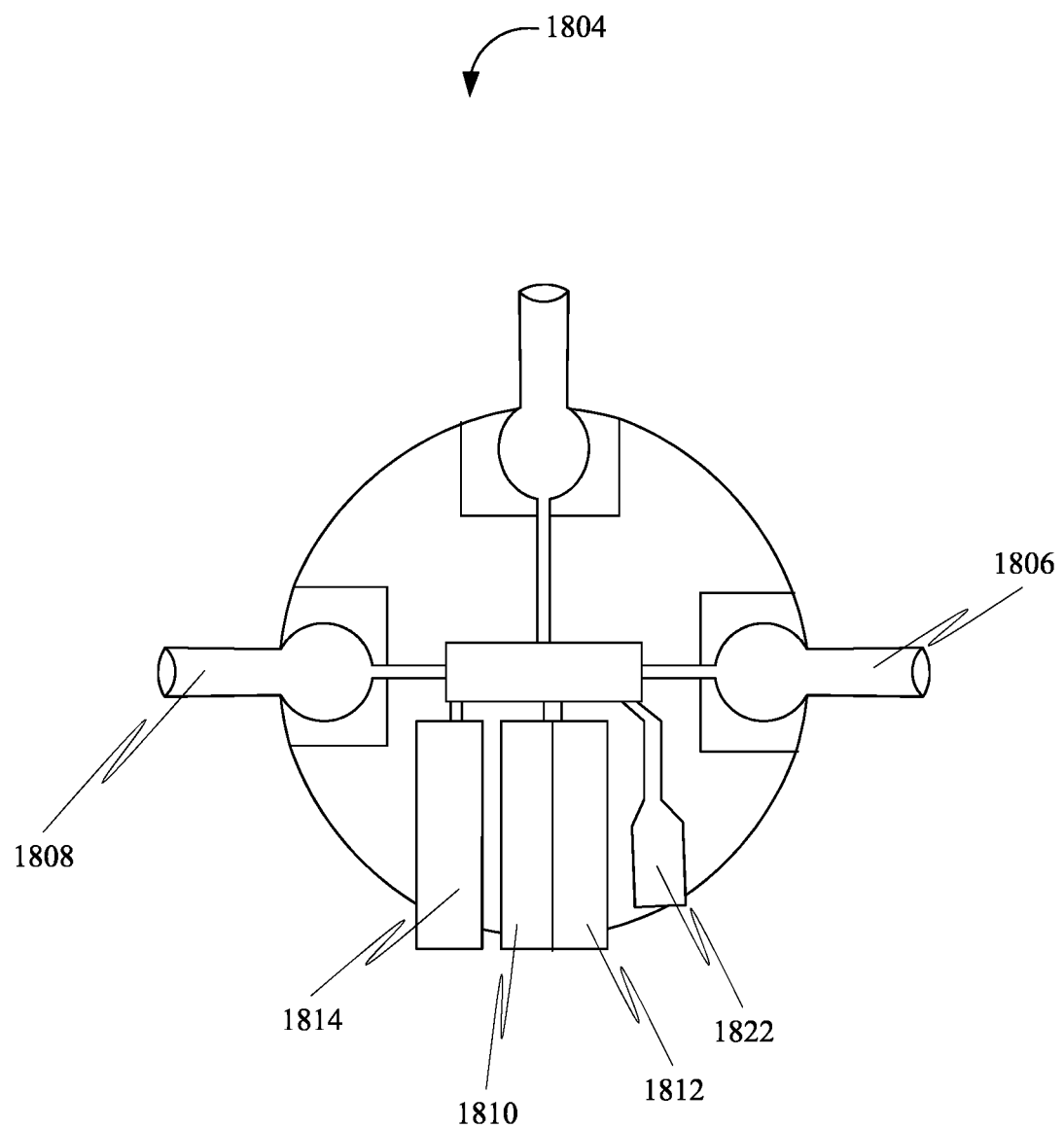
FIG. 19 is a top view of the lower hub portion of the smart collar hub of the audiovisual apparatus, in accordance with some embodiments.

FIG. 19 is a top view of the lower hub portion 1804 of the smart collar hub 1800 of the audiovisual apparatus, in accordance with some embodiments.

Figure 20:
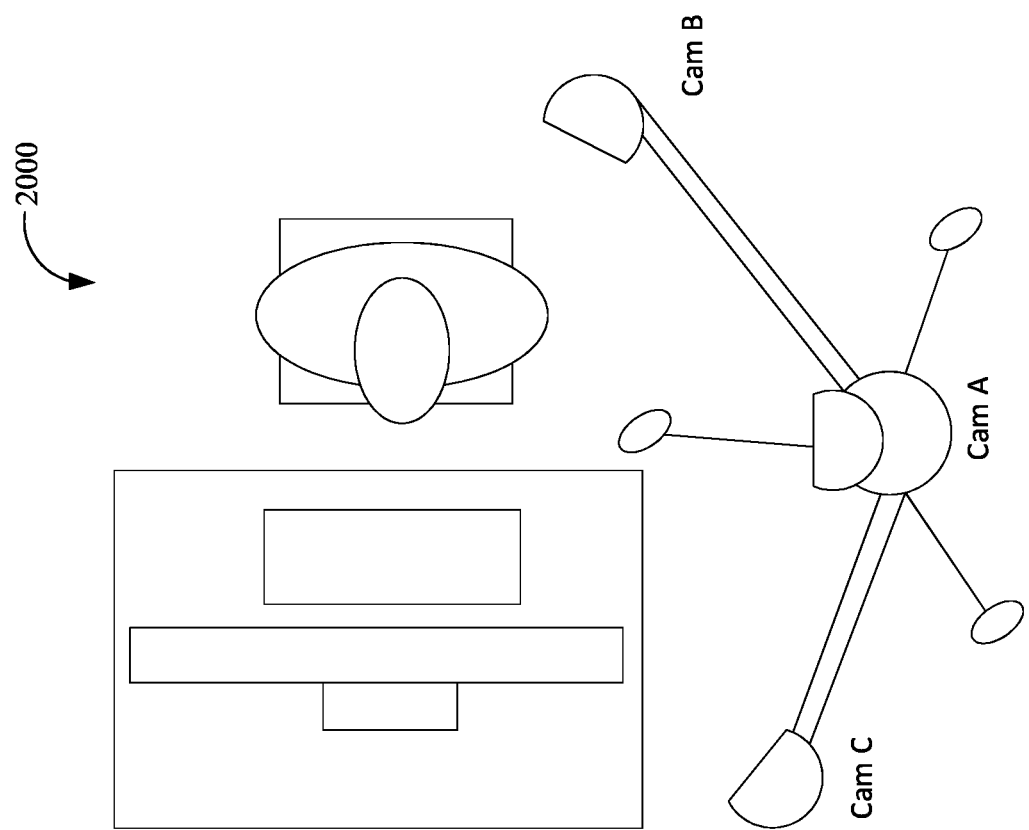
FIG. 20 is a top view of an audiovisual apparatus for facilitating multiple recordings from multiple viewpoints using multiple recording devices, in accordance with some embodiments.

FIG. 20 is a top view of an audiovisual apparatus 2000 for facilitating multiple recordings from multiple viewpoints using multiple recording devices, in accordance with some embodiments. Further, the audiovisual apparatus 2000 may include a camera A, a camera B, and a camera C for facilitating three recordings using the camera A, the camera B, and the camera C from three viewpoints simultaneously.

Figure 21:
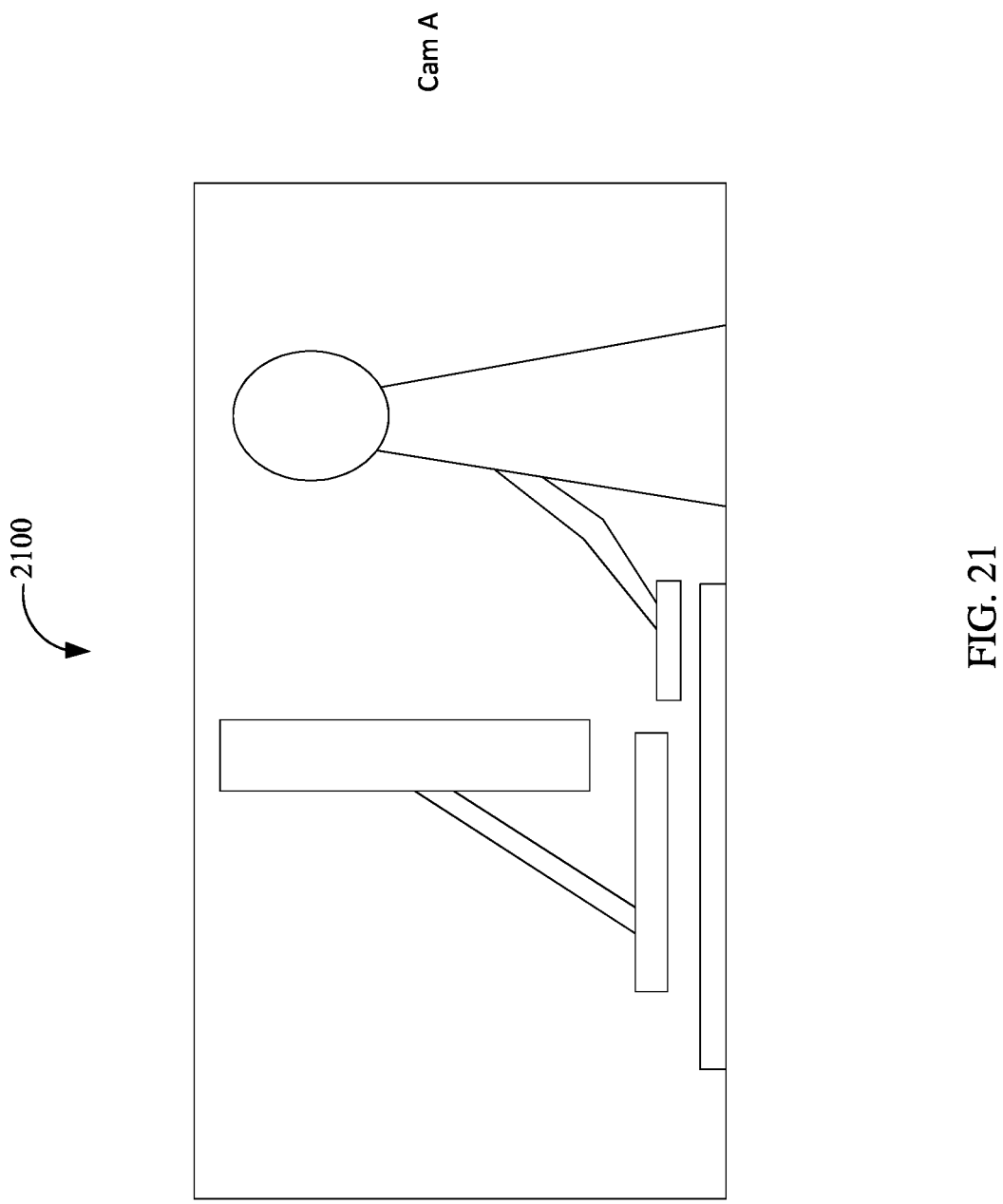
FIG. 21 illustrates a first view recorded from a first viewpoint of the multiple viewpoints, in accordance with some embodiments.

FIG. 21 illustrates a first view 2100 recorded from a first viewpoint of the multiple viewpoints, in accordance with some embodiments. Further, the first viewpoint corresponds to the camera A.

Figure 22:
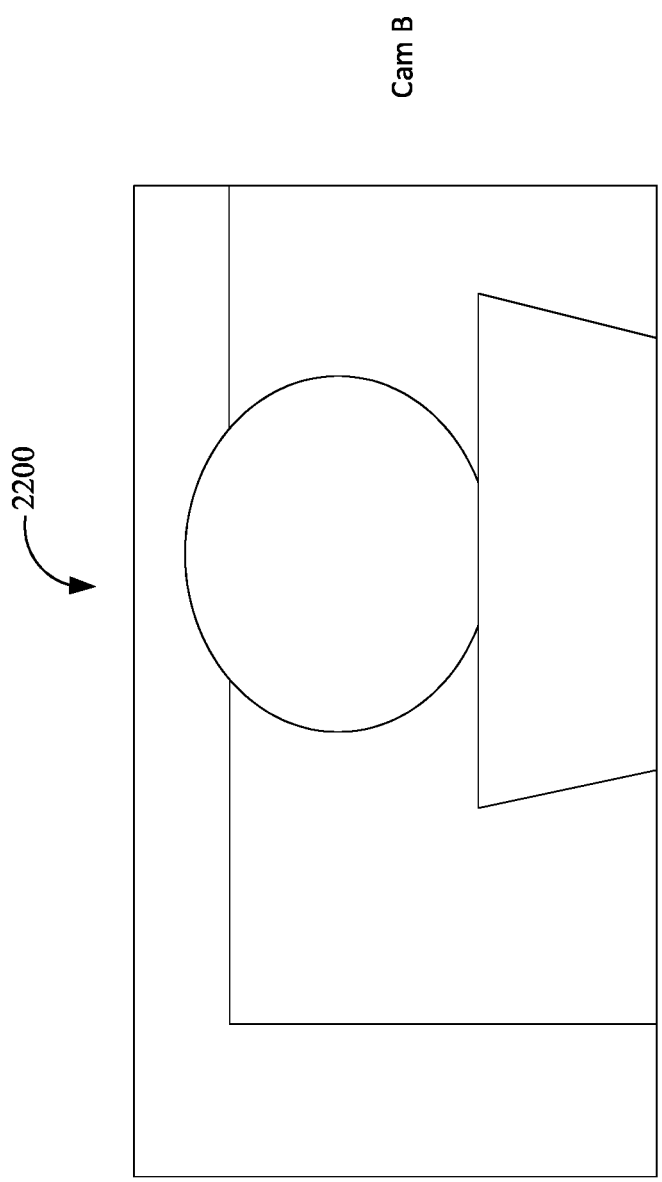
FIG. 22 illustrates a second view recorded from a second viewpoint of the multiple viewpoints, in accordance with some embodiments.

FIG. 22 illustrates a second view 2200 recorded from a second viewpoint of the multiple viewpoints, in accordance with some embodiments. Further, the second viewpoint corresponds to the camera B.

Figure 23:
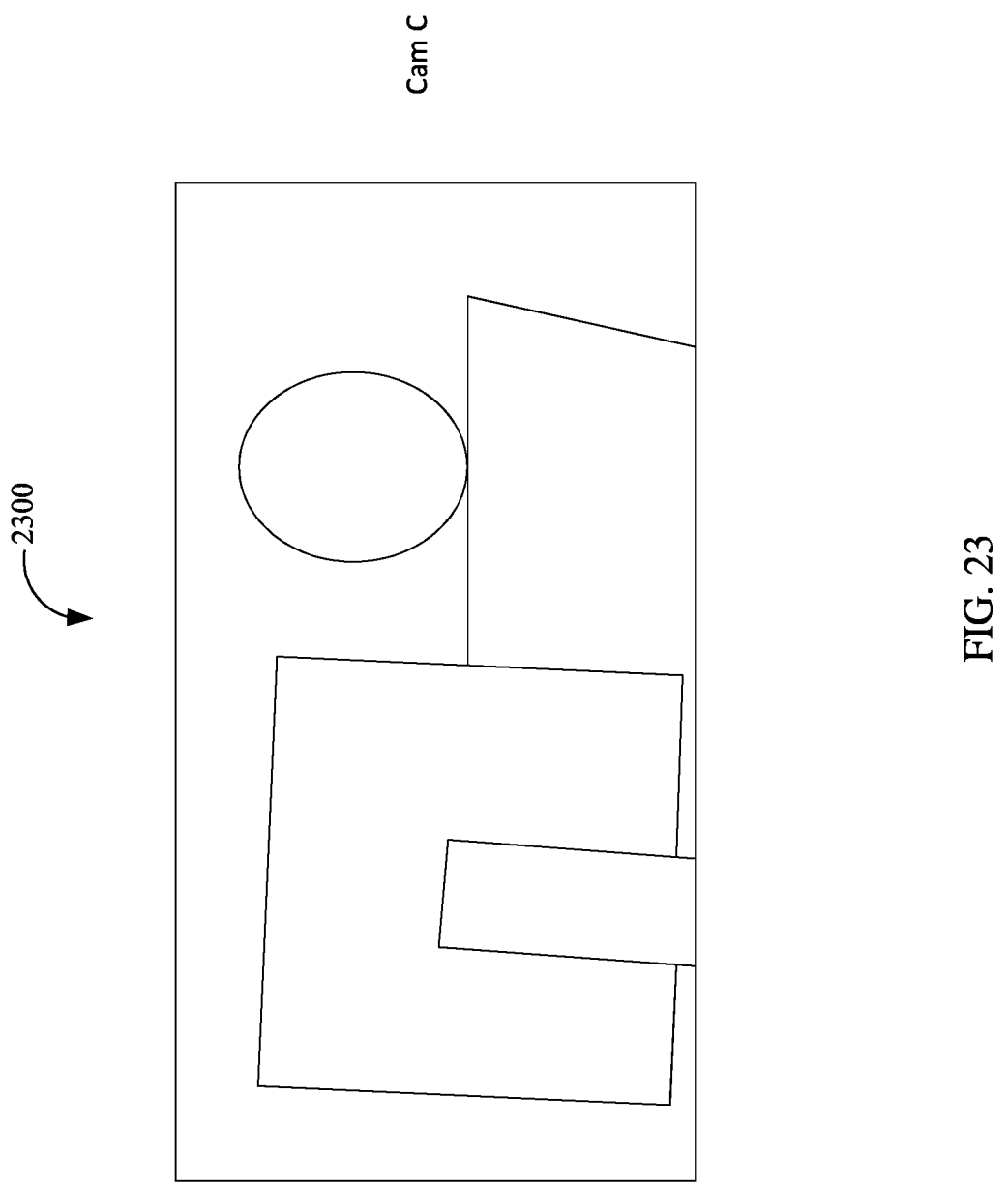
FIG. 23 illustrates a third view recorded from a third viewpoint of the multiple viewpoints, in accordance with some embodiments.

FIG. 23 illustrates a third view 2300 recorded from a third viewpoint of the multiple viewpoints, in accordance with some embodiments. Further, the third viewpoint corresponds to the camera C.

FIG. 24 is a top view of an audiovisual apparatus 2400 for facilitating multiple recordings from multiple viewpoints using multiple recording devices, in accordance with some embodiments.

Figure 25:
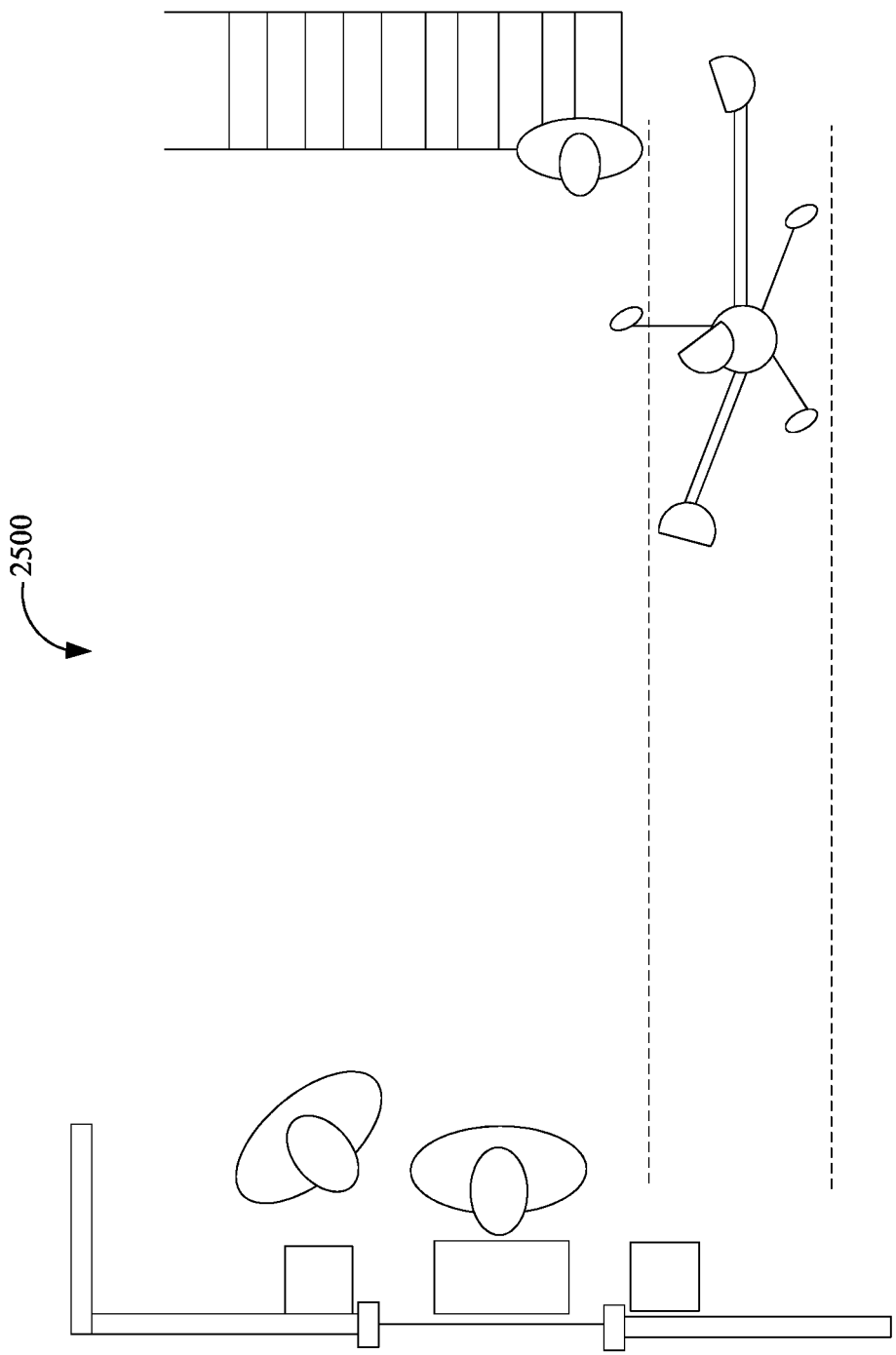
FIG. 25 is a top view of an audiovisual apparatus for facilitating multiple recordings from multiple viewpoints using multiple recording devices, in accordance with some embodiments.

FIG. 25 is a top view of an audiovisual apparatus 2500 for facilitating multiple recordings from multiple viewpoints using multiple recording devices, in accordance with some embodiments.

Figure 26:
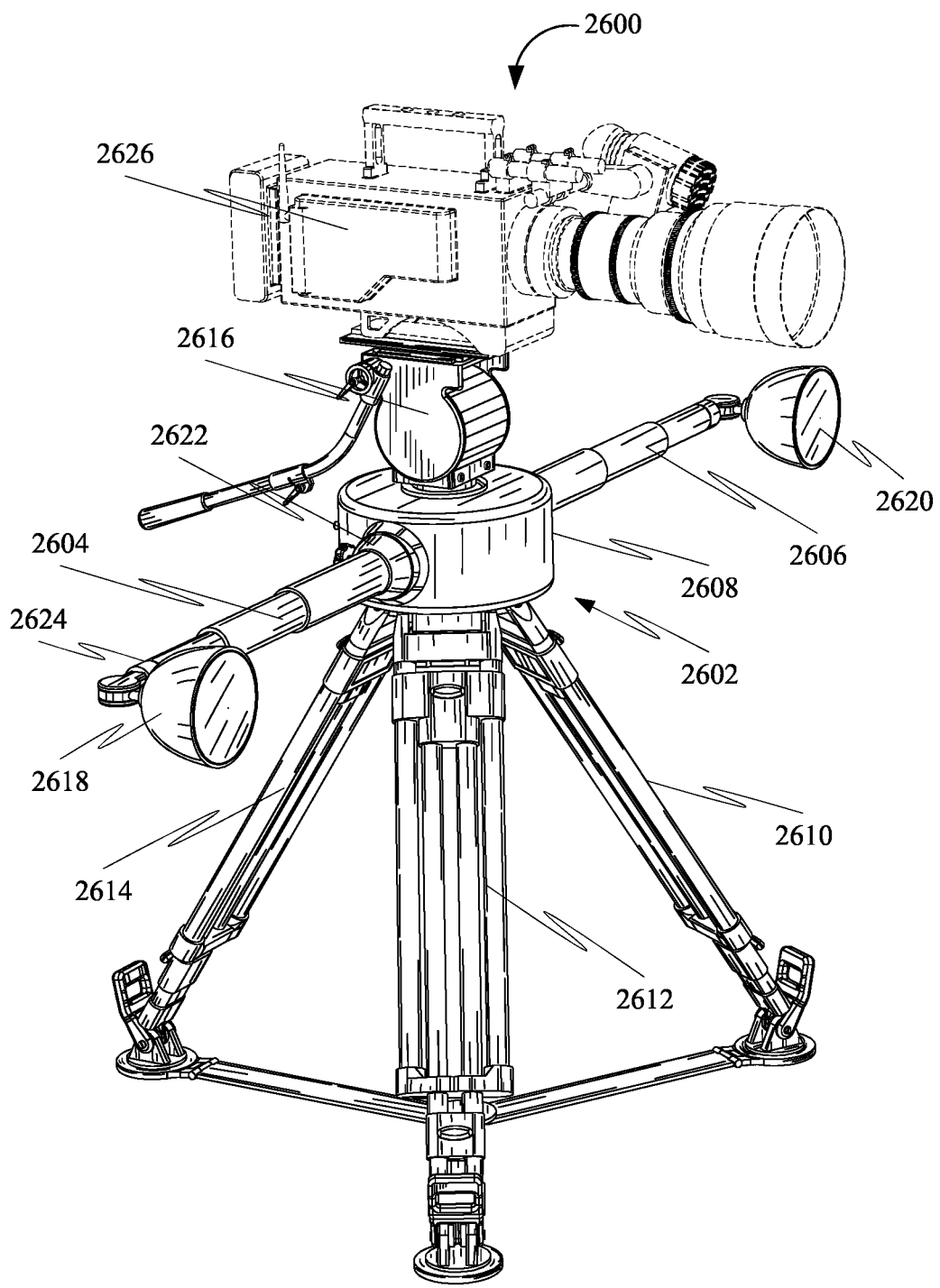
FIG. 26 is a top front perspective view of a standalone audiovisual apparatus for the simultaneous acquisition and management of coverage, the simultaneous recording, and live on-the-fly editing of multiple angles, in accordance with some embodiments.

FIG. 26 is a top front perspective view of a standalone audiovisual apparatus 2600 for the simultaneous acquisition and management of coverage, the simultaneous recording, and live on-the-fly editing of multiple angles, in accordance with some embodiments. Further, the audiovisual apparatus 2600 may include a body 2602 and a plurality of arms 2604-2606. Further, the body 2602 may include an upper body portion 2608 and a lower body portion 2610-2614. Further, the upper body portion 2608 may include at least one body adapter 2616 disposed on the upper body portion 2608. Further, the at least one body adapter 2616 may be configured for detachably attaching at least one primary recording device 2626 to the at least one body adapter 2616. Further, the lower body portion 2610-2614 may be disposable on at least one surface. Further, the lower body portion 2610-2614 may be configured for positioning the audiovisual apparatus 2600 in at least one position. Further, the lower body portion 2610-2614 may include a plurality of legs. Further, a first leg end of each of the plurality of legs may be attached to the upper body portion 2608. Further, a second leg end of each of the plurality of legs may be disposable on the at least one surface. Further, the plurality of legs may be configured for moving between a plurality of leg positions. Further, the positioning of the audiovisual apparatus 2600 in the at least one position may be based on the moving of the plurality of legs between the plurality of leg positions. Further, the positioning of the audiovisual apparatus 2600 positions the at least one primary recording device 2626 in at least one primary recording position. Further, the plurality of arms 2604-2606 may be coupled to the body 2602. Further, the plurality of arms 2604-2606 extends away from the body 2602. Further, a first arm end 2622 of each of the plurality of arms 2604-2606 may be attached to the upper body portion 2608. Further, the plurality of arms 2604-2606 may include a plurality of arm adapters 2618-2620. Further, an arm adapter of the plurality of arm adapters 2618-2620 may be comprised in a second arm end 2624 of each of the plurality of arms 2604-2606. Further, the plurality of arm adapters 2618-2620 may be configured for detachably attaching a plurality of secondary recording devices to the plurality of arm adapters 2618-2620. Further, the plurality of arms 2604-2606 may be configured for moving between a plurality of arm positions in relation to the body 2602 for positioning the plurality of secondary recording devices in a plurality of secondary recording positions.

Further, in some embodiments, the at least one body adapter 2616 may be configured for rotating the at least one primary recording device 2626 around at least one of three mutually perpendicular primary axes of the at least one primary recording device 2626. Further, the rotating orients the at least one primary recording device 2626 in at least one primary orientation.

Further, in some embodiments, the plurality of arm adapters 2618-2620 may be configured for rotating the plurality of secondary recording devices around at least one of three mutually perpendicular secondary axes of the plurality of secondary recording devices. Further, the rotating orients the plurality of secondary recording devices in at least one secondary orientation. Further, in an embodiment, the plurality of arm adapters 2618-2620 may include a plurality of suppressing assemblies. Further, the plurality of suppressing assemblies may be coupled with the plurality of secondary recording devices. Further, the plurality of suppressing assemblies may be configured of suppressing a rotation of the plurality of secondary recording devices around at least one of the three mutually perpendicular secondary axes of the plurality of secondary recording devices based on the moving of the plurality of arms 2604-2606 between the plurality of arm positions.

Figure 27:
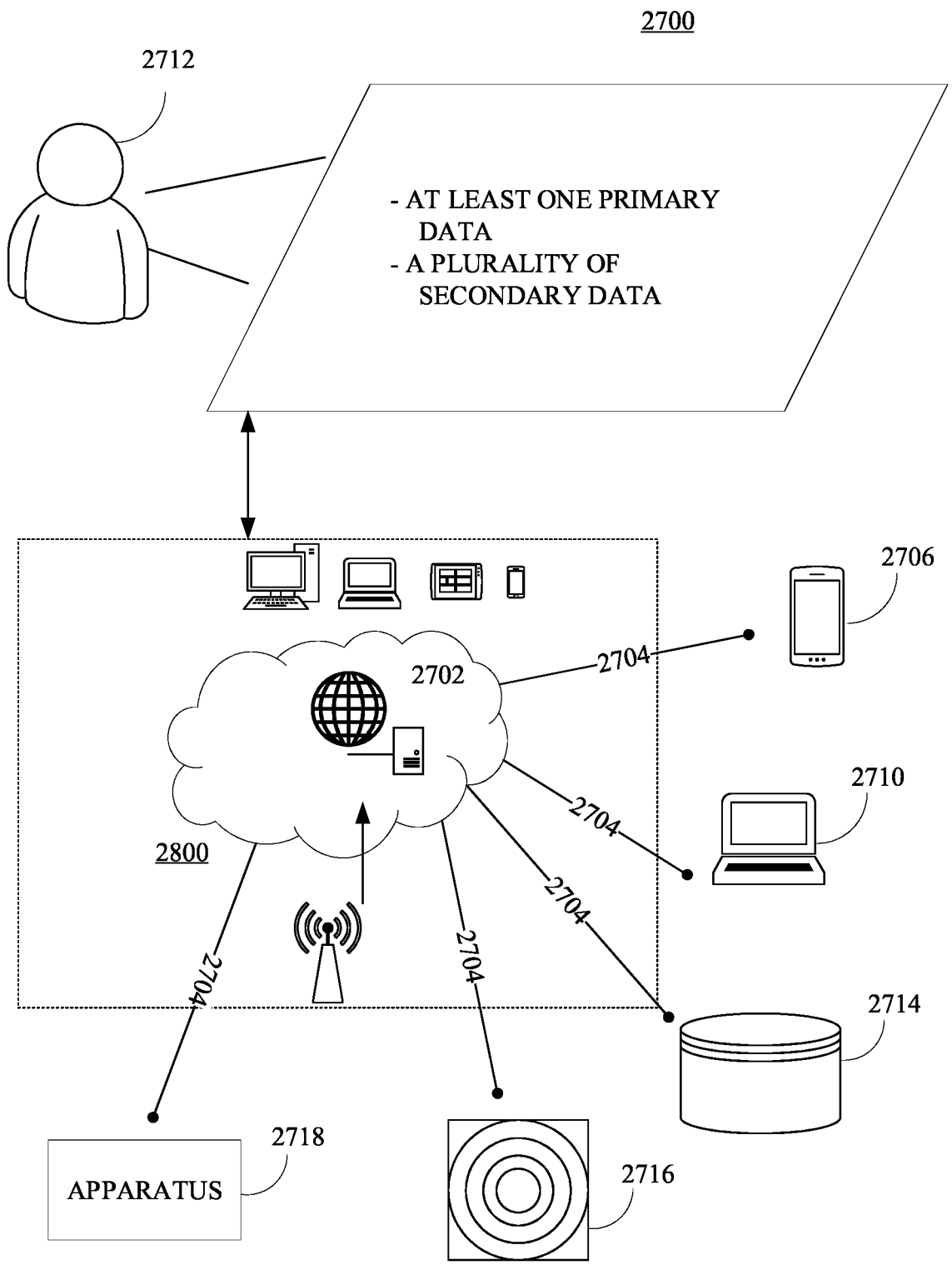
FIG. 27 is an illustration of an online platform consistent with various embodiments of the present disclosure.

FIG. 27 is an illustration of an online platform 2700 consistent with various embodiments of the present disclosure. By way of non-limiting example, the online platform 2700 to facilitate the simultaneous acquisition and management of coverage, the simultaneous recording, and live on-the-fly editing of multiple angles may be hosted on a centralized server 2702, such as, for example, a cloud computing service. The centralized server 2702 may communicate with other network entities, such as, for example, a mobile device 2706 (such as a smartphone, a laptop, a tablet computer, etc.), other electronic devices 2710 (such as desktop computers, server computers, etc.), databases 2714, sensors 2716, and an apparatus 2718 (such as the audiovisual apparatus 100, the audiovisual apparatus 2600, etc.) over a communication network 2704, such as but not limited to, the Internet. Further, users of the online platform 2700 may include relevant parties such as, but not limited to, end-users, administrators, service providers, service consumers, and so on. Accordingly, in some instances, electronic devices operated by the one or more relevant parties may be in communication with the platform.

A user 2712, such as the one or more relevant parties, may access online platform 2700 through a web based software application or browser. The web based software application may be embodied as, for example, but not be limited to, a website, a web application, a desktop application, and a mobile application compatible with a computing device 2800.

Figure 28:
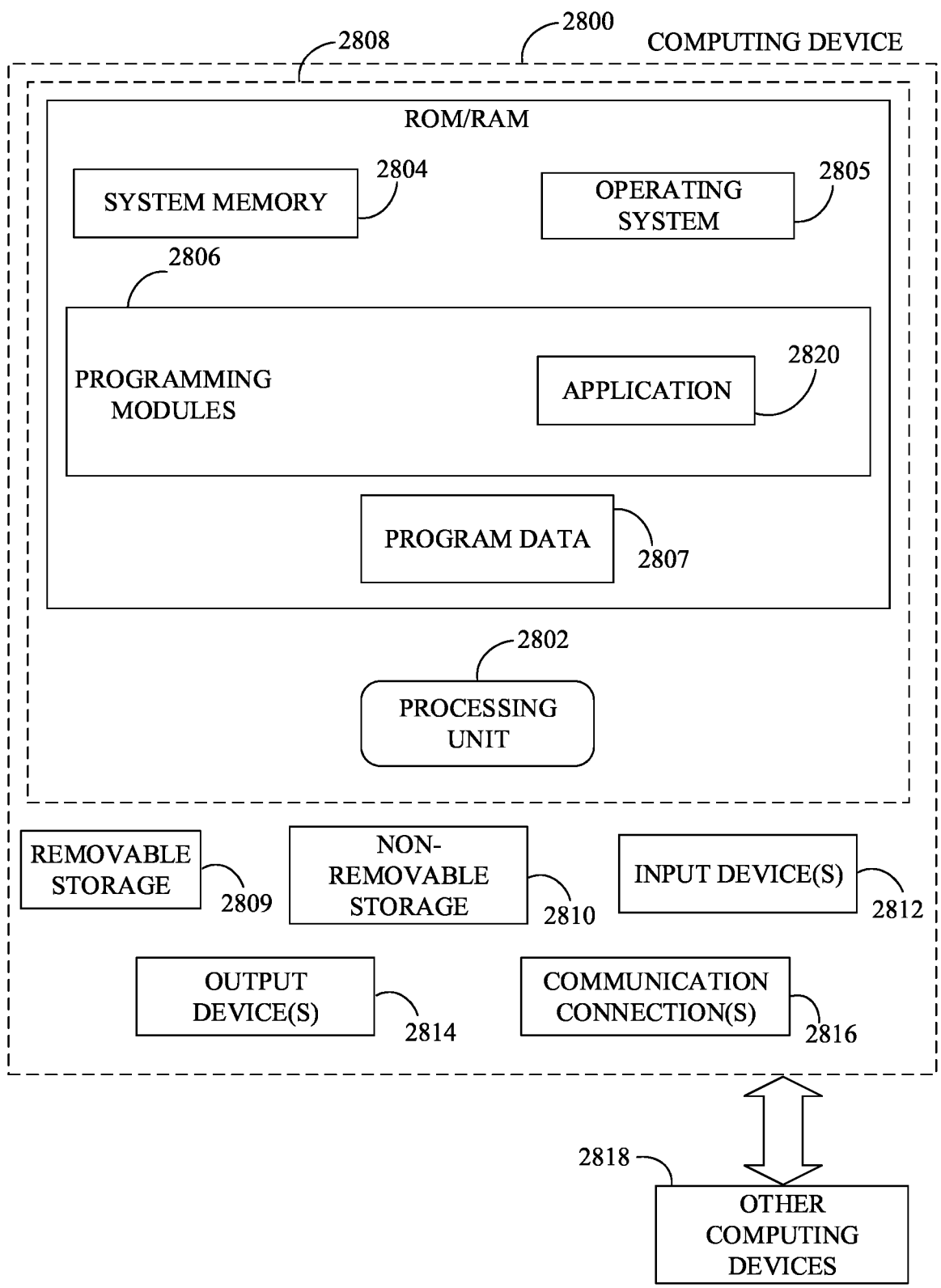
FIG. 28 is a block diagram of a computing device for implementing the methods disclosed herein, in accordance with some embodiments.

With reference to FIG. 28, a system consistent with an embodiment of the disclosure may include a computing device or cloud service, such as computing device 2800. In a basic configuration, computing device 2800 may include at least one processing unit 2802 and a system memory 2804. Depending on the configuration and type of computing device, system memory 2804 may comprise, but is not limited to, volatile (e.g. random-access memory (RAM)), non-volatile (e.g. read-only memory (ROM)), flash memory, or any combination. System memory 2804 may include operating system 2805, one or more programming modules 2806, and may include a program data 2807. Operating system 2805, for example, may be suitable for controlling computing device 2800's operation. Furthermore, embodiments of the disclosure may be practiced in conjunction with a graphics library, other operating systems, or any other application program and is not limited to any particular application or system. This basic configuration is illustrated in FIG. 28 by those components within a dashed line 2808.

Computing device 2800 may have additional features or functionality. For example, computing device 2800 may also include additional data storage devices (removable and/or non-removable) such as, for example, magnetic disks, optical disks, or tape. Such additional storage is illustrated in FIG. 28 by a removable storage 2809 and a non-removable storage 2810. Computer storage media may include volatile and non-volatile, removable and non-removable media implemented in any method or technology for storage of information, such as computer-readable instructions, data structures, program modules, or other data. System memory 2804, removable storage 2809, and non-removable storage 2810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2800. Any such computer storage media may be part of device 2800. Computing device 2800 may also have input device(s) 2812 such as a keyboard, a mouse, a pen, a sound input device, a touch input device, a location sensor, a camera, a biometric sensor, etc. Output device(s) 2814 such as a display, speakers, a printer, etc. may also be included. The aforementioned devices are examples and others may be used.

Computing device 2800 may also contain a communication connection 2816 that may allow device 2800 to communicate with other computing devices 2818, such as over a network in a distributed computing environment, for example, an intranet or the Internet. Communication connection 2816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2804, including operating system 2805. While executing on processing unit 2802, programming modules 2806 may perform processes including, for example, one or more stages of methods, algorithms, systems, applications, servers, databases as described above. The aforementioned process is an example, and processing unit 2802 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 29:
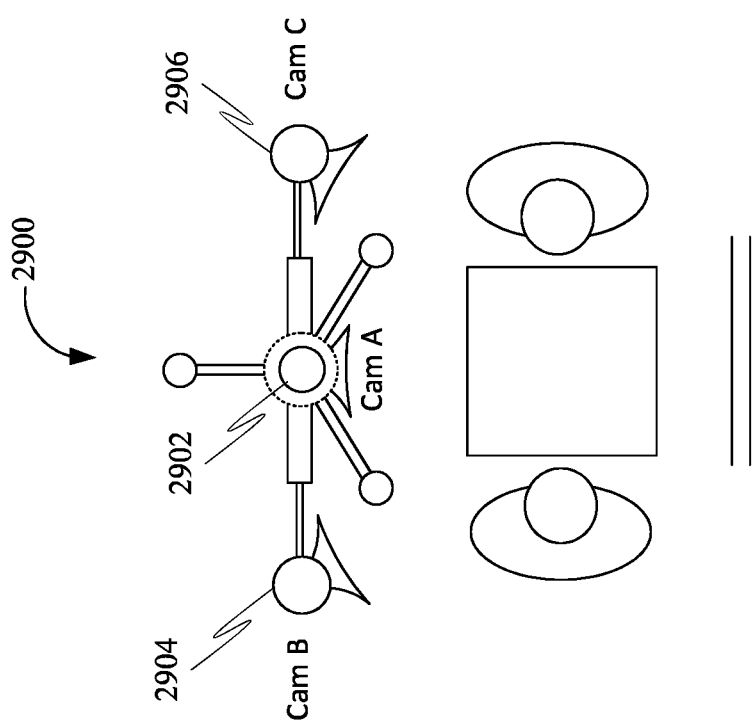
FIG. 29 is a top view of an audiovisual apparatus for facilitating multiple recordings from multiple viewpoints using multiple recording devices, in accordance with some embodiments.

FIG. 29 is a top view of an audiovisual apparatus 2900 for facilitating multiple recordings from multiple viewpoints using multiple recording devices, in accordance with some embodiments. Further, the audiovisual apparatus 2900 may include a camera A 2902, a camera B 2904, and a camera C 2906 for facilitating three recordings using the camera A 2902, the camera B 2904, and the camera C 2906 from three viewpoints. Further, the three viewpoints may include three camera angles. Further, the three camera angles may include a master shot, an angle shot, and a reverse angle shot. Further, the camera A 2902 may be associated with the master shot, the camera B 2904 may be associated with the angle shot, and the camera C 2906 may be associated with the reverse angle shot. Further, the audiovisual apparatus 2900 may be configured for executing a software application. Further, the audiovisual apparatus 2900 may be configured for performing a plurality of functions based on the executing of the software application. Further, the software application may be configured for running the audiovisual apparatus 2900. Further, the plurality of functions may include pre-production, production, and post-production.

Further, the pre-production may include dragging and dropping the audiovisual apparatus 2900 based on actor blocking. Further, the pre-production may include prescribing at least one camera movement of at least one of the camera A 2902, the camera B 2904, and the camera C 2906.

Figure 33:
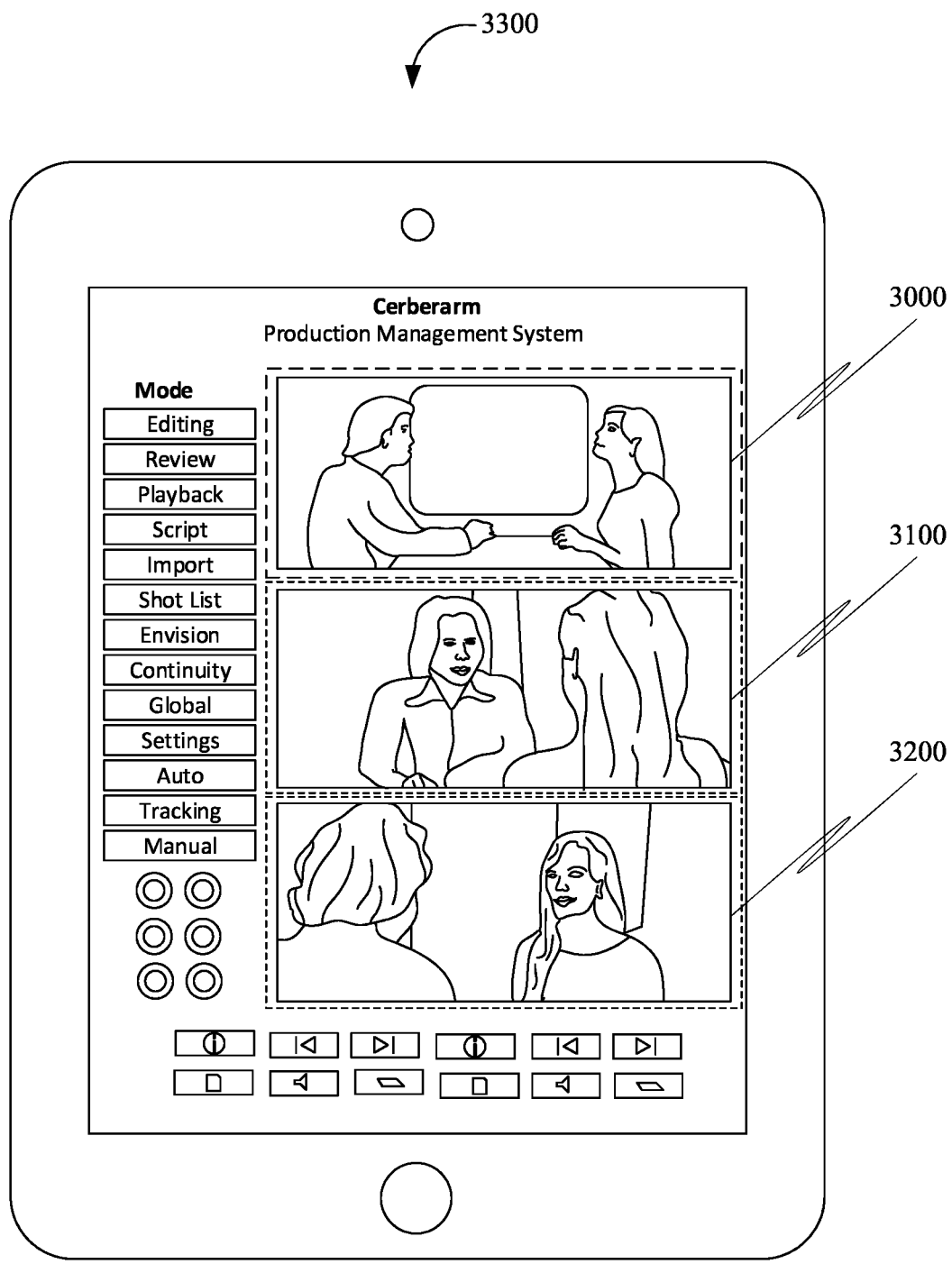
FIG. 33 is a front view of the user device for displaying the three scenes simultaneously, in accordance with some embodiments.

Further, the production may include managing the at least one of the camera A 2902, the camera B 2904, and the camera C 2906. Further, the managing may include selecting the at least one of the camera A 2902, the camera B 2904, and the camera C 2906 for recording at least one of three scenes. Further, the three scenes correspond to the three recordings from the three camera angles. Further, the audiovisual apparatus 2900 may include a communication device configured for transmitting the three scenes to a user device 3300 (such as a tablet), as shown in FIG. 33. Further, the user device 3300 may be configured for executing the software application. Further, the user device 3300 may be configured for displaying the three scenes simultaneously on the user device 3300. Further, the production may include editing the three scenes by interfacing with the user device 3300. Further, the interfacing may include tapping the at least one of the three scenes displayed on the user device 3300.

Further, the post-production may include enabling ingestion of at least one pre-edited scene into a filmmaker's NLE timeline. Further, the post-production may include providing plugins for facilitating the enabling of the ingesting of the at least one pre-edited scene.

Figure 30:
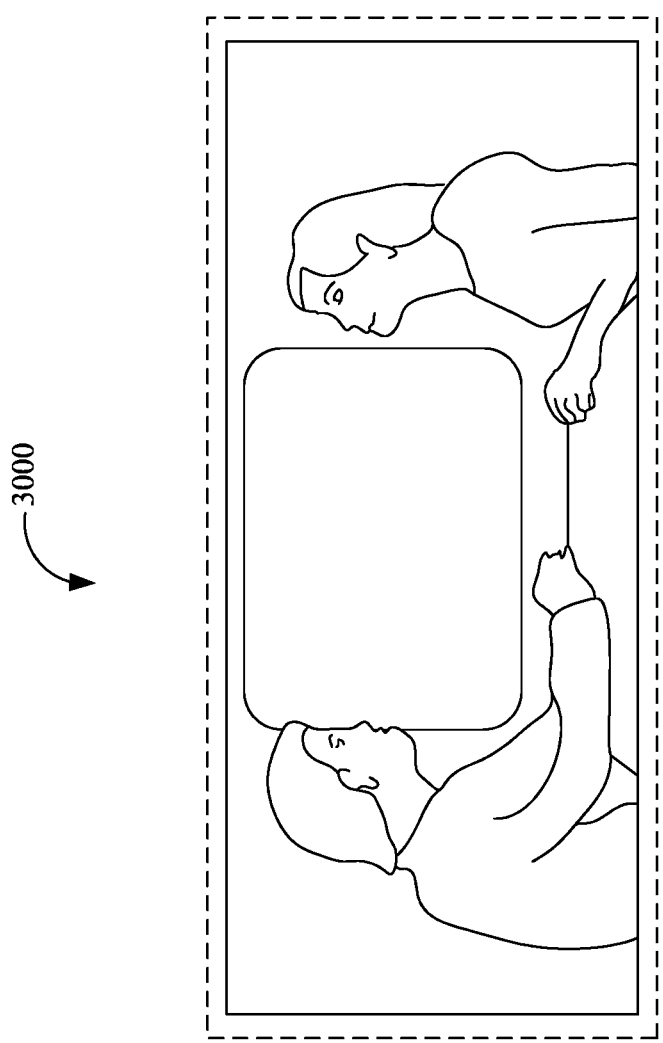
FIG. 30 illustrates a first scene of the three scenes associated with the camera A, in accordance with some embodiments.

FIG. 30 illustrates a first scene 3000 of the three scenes associated with the camera A 2902, in accordance with some embodiments. Further, the first scene 3000 may be associated with the master shot.

Figure 31:
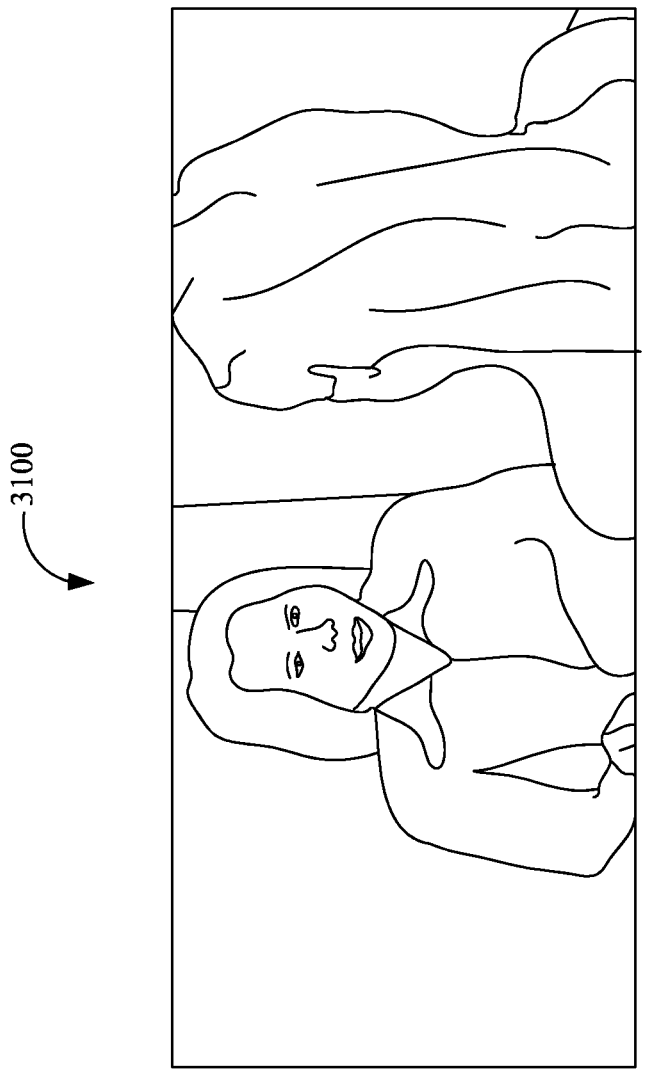
FIG. 31 illustrates a second scene of the three scenes associated with the camera B, in accordance with some embodiments.

FIG. 31 illustrates a second scene 3100 of the three scenes associated with the camera B 2904, in accordance with some embodiments. Further, the second scene 3100 may be associated with the angle shot.

Figure 32:
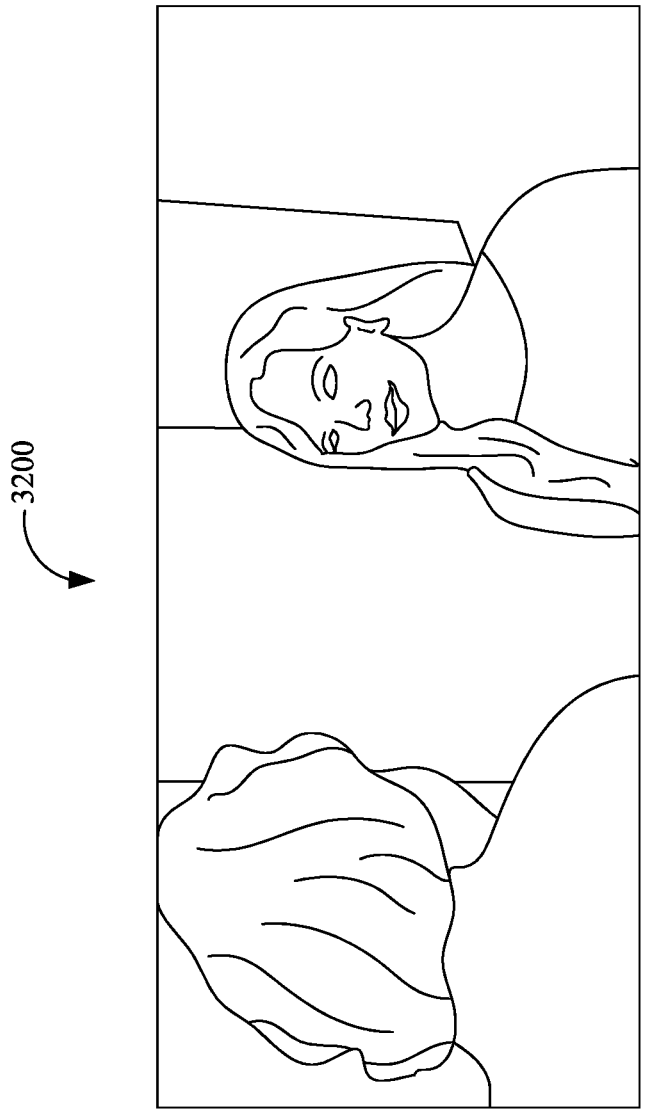
FIG. 32 illustrates a third scene of the three scenes associated with the camera C, in accordance with some embodiments.

FIG. 32 illustrates a third scene 3200 of the three scenes associated with the camera C 2906, in accordance with some embodiments. Further, the third scene 3200 may be associated with the reverse angle shot.

FIG. 33 is a front view of the user device 3300 for displaying the three scenes simultaneously, in accordance with some embodiments. Further, the three scenes may include the first scene 3000, the second scene 3100, and the third scene 3200. Further, the user device 3300 may be used for monitoring the three scenes. Further, a user may tap on a screen of the user device 3300 for selecting at least one of the three scenes as actors deliver their lines. Further, the software application may be executed on the user device 3300. Further, the user device 3300 may be configured for performing the production. Further, the production may include tagging a selection of the at least one of the three scenes. Further, the production may include assembling a rough cut based on the selection. Further, the user device 3300 may be configured for displaying the rough cut.

FIG. 34 illustrates daisy-chain and synchronization of multiple audiovisual apparatuses for crossing room distances for facilitating multiple recordings, in accordance with some embodiments.

FIG. 35 illustrates a drag and drop floor plan of multiple audiovisual apparatuses for facilitating multiple recordings, in accordance with some embodiments.

Although the present disclosure has been explained in relation to its preferred embodiment, it is to be understood that many other possible modifications and variations can be made without departing from the spirit and scope of the disclosure.

What is claimed is:

1. A standalone audiovisual apparatus for the simultaneous acquisition and management of coverage, the simultaneous recording, and live on-the-fly editing of multiple angles, the audiovisual apparatus comprising:
   a body comprising an upper body portion and a lower body portion, wherein the upper body portion comprises at least one body adapter disposed on the upper body portion, wherein the at least one body adapter is configured for detachably attaching at least one primary recording device to the at least one body adapter, wherein the lower body portion is disposable on at least one surface, wherein the lower body portion is configured for positioning the audiovisual apparatus in at least one position, wherein the positioning of the audiovisual apparatus positions the at least one primary recording device in at least one primary recording position; and
   a plurality of arms coupled to the body, wherein the plurality of arms extends away from the body, wherein a first arm end of each of the plurality of arms is attached to the upper body portion, wherein the plurality of arms comprises a plurality of arm adapters, wherein an arm adapter of the plurality of arm adapters is comprised in a second arm end of each of the plurality of arms, wherein the plurality of arm adapters is configured for detachably attaching a plurality of secondary recording devices to the plurality of arm adapters, wherein the plurality of arms is configured for moving between a plurality of arm positions in relation to the body for positioning the plurality of secondary recording devices in a plurality of secondary recording positions;
   a controller disposed in the body, wherein the controller is configured for:
      receiving at least one input data from at least one input device;
      analyzing the at least one input data; and
      generating a command based on the analyzing; and
   a plurality of actuators communicatively coupled with the controller, wherein the plurality of actuators is operationally coupled with the plurality of arms, wherein the plurality of actuators is configured for moving the plurality of arms between the plurality of arm positions based on the command.

2. The audiovisual apparatus of claim 1, wherein the upper body portion is movably attached to the lower body portion, wherein the upper body portion is configured for rotating between a plurality of upper body positions in relation to the lower body portion around at least one body axis of the upper body portion in the at least one position of the audiovisual apparatus, wherein the rotating further positions the at least one primary recording device in the at least one primary recording position.

3. The audiovisual apparatus of claim 1, wherein the upper body portion is removably attached to the lower body portion.

4. The audiovisual apparatus of claim 1, wherein the at least one body adapter is configured for rotating the at least one primary recording device around at least one of three mutually perpendicular primary axes of the at least one primary recording device, wherein the rotating orients the at least one primary recording device in at least one primary orientation.

5. The audiovisual apparatus of claim 1, wherein the plurality of arm adapters is configured for rotating the plurality of secondary recording devices around at least one of three mutually perpendicular secondary axes of the plurality of secondary recording devices, wherein the rotating orients the plurality of secondary recording devices in at least one secondary orientation.

6. The audiovisual apparatus of claim 5, wherein the plurality of arm adapters comprises a plurality of suppressing assemblies, wherein the plurality of suppressing assemblies is coupled with the plurality of secondary recording devices, wherein the plurality of suppressing assemblies is configured of suppressing a rotation of the plurality of secondary recording devices around at least one of the three mutually perpendicular secondary axes of the plurality of secondary recording devices based on the moving of the plurality of arms between the plurality of arm positions.

7. The audiovisual apparatus of claim 6, wherein the plurality of suppressing assemblies is further configured for suppressing at least one rotation of the plurality of secondary recording devices around at least one secondary axis of the three mutually perpendicular secondary axes based on the rotation of the plurality of secondary recording devices around at least two of the three mutually perpendicular secondary axes.

8. The audiovisual apparatus of claim 1, wherein the plurality of arms is rotatably coupled to the body, wherein the moving comprises rotating the plurality of arms around at least one arm axis of the plurality of arms between the plurality of arm positions, wherein the positioning of the plurality of secondary recording devices in the plurality of secondary recording positions is further based on the rotating of the plurality of arms.

9. The audiovisual apparatus of claim 1, wherein the plurality of arms is extendably coupled to the body, wherein the moving comprises retractably extending the plurality of arms between the plurality of arm positions, wherein the positioning of the plurality of secondary recording devices in the plurality of secondary recording positions is further based on the retractably extending of the plurality of arms.

10. The audiovisual apparatus of claim 1, wherein an arm of the plurality of arms comprises a telescopic body, wherein a first end of the telescopic body is attached to the upper body portion, wherein the arm adapter is comprised in a second end of the telescopic body, wherein the telescopic body is configured for retractably extending and rotating the arm between the plurality of arm positions for the positioning of the plurality of secondary recording devices in the plurality of secondary recording positions.

11. The audiovisual apparatus of claim 1, wherein the lower body portion comprises a plurality of wheels disposed on the lower body portion, wherein the plurality of wheels is configured for movably disposing the lower body portion on the at least one surface, wherein the positioning of the audiovisual apparatus in the at least one position is based on the movably disposing of the lower body portion.

12. The audiovisual apparatus of claim 1, wherein the lower body portion comprises a plurality of legs, wherein a first leg end of each of the plurality of legs is attached to the upper body portion, wherein a second leg end of each of the plurality of legs is disposable on the at least one surface, wherein the plurality of legs is configured for moving between a plurality of leg positions, wherein the positioning of the audiovisual apparatus in the at least one position is further based on the moving of the plurality of legs between the plurality of leg positions.

13. The audiovisual apparatus of claim 12, wherein a leg of the plurality of legs comprises a telescopic body, wherein a first end of the telescopic body is attached to the upper body portion, wherein a second end of the telescopic body is disposable on the at least one surface, wherein the telescopic body is configured for at least one of retractably extending and rotating the leg between the plurality of leg positions.

14. The audiovisual apparatus of claim 1 further comprising:
  a memory device disposed in the body, wherein the memory device is communicatively coupled with at least one of the at least one primary recording device and the plurality of secondary recording devices using at least one of a wired communication channel and a wireless communication channel, wherein the at least one primary recording device generates at least one primary data, wherein the plurality of secondary recording devices generates a plurality of secondary data, wherein the memory device is configured for storing at least one of the at least one primary data and the plurality of secondary data; and
  a communication device disposed in the body, wherein the communication device is communicatively coupled with the memory device, wherein the communication device is configured for transmitting the at least one of the at least one primary data and the plurality of secondary data to at least one user device.

15. The audiovisual apparatus of claim 14 further comprising:
  a controller disposed in the body, wherein the controller is communicatively coupled with the memory device, wherein the controller is configured for:
    analyzing the at least one of the at least one primary data and the plurality of secondary data using at least one artificial intelligence model; and
    generating a first command based on the analyzing; and
  a plurality of first actuators communicatively coupled with the controller, wherein the plurality of first actuators is operationally coupled with the plurality of arms, wherein the plurality of first actuators is configured for moving the plurality of arms between the plurality of arm positions based on the first command.

16. A standalone audiovisual apparatus for the simultaneous acquisition and management of coverage, the simultaneous recording, and live on-the-fly editing of multiple angles, the audiovisual apparatus comprising:
  a body comprising an upper body portion and a lower body portion, wherein the upper body portion comprises at least one body adapter disposed on the upper body portion, wherein the at least one body adapter is configured for detachably attaching at least one primary recording device to the at least one body adapter, wherein the lower body portion is disposable on at least one surface, wherein the lower body portion is configured for positioning the audiovisual apparatus in at least one position, wherein the lower body portion comprises a plurality of legs, wherein a first leg end of each of the plurality of legs is attached to the upper body portion, wherein a second leg end of each of the plurality of legs is disposable on the at least one surface, wherein the plurality of legs is configured for moving between a plurality of leg positions, wherein the positioning of the audiovisual apparatus in the at least one position is further based on the moving of the plurality of legs between the plurality of leg positions, wherein the positioning of the audiovisual apparatus positions the at least one primary recording device in at least one primary recording position;
  a plurality of arms coupled to the body, wherein the plurality of arms extends away from the body, wherein a first arm end of each of the plurality of arms is attached to the upper body portion, wherein the plurality of arms comprises a plurality of arm adapters, wherein an arm adapter of the plurality of arm adapters is comprised in a second arm end of each of the plurality of arms, wherein the plurality of arm adapters is configured for detachably attaching a plurality of secondary recording devices to the plurality of arm adapters, wherein the plurality of arms is configured for moving between a plurality of arm positions in relation to the body for positioning the plurality of secondary recording devices in a plurality of secondary recording positions;
  a controller disposed in the body, wherein the controller is configured for:
    receiving at least one input data from at least one input device;
    analyzing the at least one input data; and
    generating a command based on the analyzing; and
  a plurality of actuators communicatively coupled with the controller, wherein the plurality of actuators is operationally coupled with the plurality of arms, wherein the plurality of actuators is configured for moving the plurality of arms between the plurality of arm positions based on the command.

17. The audiovisual apparatus of claim 16, wherein the at least one body adapter is configured for rotating the at least one primary recording device around at least one of three mutually perpendicular primary axes of the at least one primary recording device, wherein the rotating orients the at least one primary recording device in at least one primary orientation.

18. The audiovisual apparatus of claim 16, wherein the plurality of arm adapters is configured for rotating the plurality of secondary recording devices around at least one of three mutually perpendicular secondary axes of the plurality of secondary recording devices, wherein the rotating orients the plurality of secondary recording devices in at least one secondary orientation.

19. The audiovisual apparatus of claim 18, wherein the plurality of arm adapters comprises a plurality of suppressing assemblies, wherein the plurality of suppressing assemblies is coupled with the plurality of secondary recording devices, wherein the plurality of suppressing assemblies is configured of suppressing a rotation of the plurality of secondary recording devices around at least one of the three mutually perpendicular secondary axes of the plurality of secondary recording devices based on the moving of the plurality of arms between the plurality of arm positions.

* * * * *